United States Patent [19]

Uchiyama et al.

[11] Patent Number: 5,656,214
[45] Date of Patent: Aug. 12, 1997

[54] BLOW MOLDING MACHINE

[75] Inventors: Mikio Uchiyama; Tatsuo Suzuki, both of Tokyo, Japan

[73] Assignee: Tahara Machinery Limited, Tokyo, Japan

[21] Appl. No.: 274,014

[22] Filed: Jul. 12, 1994

[30] Foreign Application Priority Data

| Jul. 21, 1993 | [JP] | Japan | 5-179543 |
| Aug. 31, 1993 | [JP] | Japan | 5-215546 |
| Mar. 30, 1994 | [JP] | Japan | 6-060657 |

[51] Int. Cl.⁶ ............................ B29C 49/04; B29C 49/78
[52] U.S. Cl. .................... 264/40.1; 264/40.6; 264/540; 425/135; 425/144; 425/150; 425/183; 425/532
[58] Field of Search .................. 264/40.1, 40.5, 264/40.7, 523, 540, 542, 543, 40.6; 425/135, 139, 150, 183, 185, 186, 190, 532, 143, 144

[56] References Cited

U.S. PATENT DOCUMENTS

| 3,860,375 | 1/1975 | Kinlow, Jr. et al. | 425/186 |
| 4,187,070 | 2/1980 | Martin, Jr. | 425/525 |
| 4,197,070 | 4/1980 | Koschmann | 264/40.6 |
| 4,880,792 | 11/1989 | Yoshioka et al. | 425/190 |
| 4,923,385 | 5/1990 | Spoetzl | 425/522 |
| 5,219,587 | 6/1993 | Seto et al. | 425/185 |
| 5,232,716 | 8/1993 | Seto et al. | 425/185 |
| 5,244,610 | 9/1993 | Kitzmiller | 264/40.1 |
| 5,284,432 | 2/1994 | Wurzer | 425/195 |
| 5,338,175 | 8/1994 | Fischer | 425/185 |

FOREIGN PATENT DOCUMENTS

| 0 265 713 | 5/1988 | European Pat. Off. |  |
| 0 538 516 A1 | 4/1993 | European Pat. Off. |  |
| 3613543 C1 | 12/1986 | Germany. |  |
| 37 37 594 | 6/1988 | Germany. |  |
| 9017716 U | 1/1992 | Germany. |  |
| 61-154912 | 7/1982 | Japan | 425/186 |
| 2 192 361 | 1/1988 | United Kingdom. |  |

OTHER PUBLICATIONS

"Mit Ausbau–Modulen nach Wunsch automatisieren", 4020 Plastverarbeiter 38 (1987) Sep., No. 9, Speyer, W. Germany, pp. 54–59.
"Fortschritte in der Werkzeugwechseltechnik an Blasformmaschinen", 279 Kunnstoffberater 38 (1993), Sep., No. 9, Isernhagen, DE, pp. 37–43.
"Metalmeccanica Plast: le changement de moule n'est plus un probleme", 986 Caoutchoucs & Plastiques 62 (1985) avril, No. 650, Paris, France, pp. 82–83.
"International Plastic Fair", Japan (Jan. 14–18,1994), pp. 1–7.
"Japan Industrial Journal", Japan (Mar. 10, 1990), p. 1.
"Synthetic Resin Journal", Japan (Mar. 9, 1994), p. 1.
"Blow Molding Machine", Tahara Machinery LTD., (Nov. 1990), pp. 1–21.
"General Purpose Blow Molding Machine", Tahara Machinery LTD., (Mar. 1993) pp. 1–4.

*Primary Examiner*—Catherine Timm
*Attorney, Agent, or Firm*—Foley & Lardner

[57] ABSTRACT

A method of controlling a blow molding machine from a completion of production of one product to a start of production of a next product comprises controlling a temperature of a resin within the blow molding machine, controlling an operation of devices from the completion of production of the one product to the start of production of the next product, controlling a sequent transport of some of the devices in predetermined positions, and controlling a change of the resin in accordance with a supply stop thereof and a data on the next product.

7 Claims, 25 Drawing Sheets

BLOW MOLDING MACHINE

BACKGROUND OF THE INVENTION

The present invention relates generally to a blow molding machine and particularly, to an automatic operation control of the blow molding machine from a completion of production of one product to a start of production of a next product.

The blow molding machine is a machine which serves to make resin hollow moldings in accordance with the shape of a cavity formed in a mold held by a mold clamping unit. Upon molding operation, parisons as supplied from an extruder are received in the mold, and subjected to air blown out of a calibrating unit.

Due to a diversity of resin hollow moldings, it is necessary to prepare molds as well as molding jigs such as a blow pin, die and core which are adapted thereto.

An installation of a plurality of blow molding mchines to correspond to different types of resin hollow moldings is uneconomical, so that a single blow molding machine is generally used wherein different types of resin hollow moldings are formed by changing the molds and the molding jigs.

Conventionally, an exchange of the molds and the molding jigs are carried out manually, and not automatically. This does not allow a continuous operation of the blow molding machine.

With such a manual exchange, however, the operator can drop the mold having a heavy weight even when using a lifter, a roller, etc., resulting in a possible injury.

Further, when mounting and detaching the die and core, a scrubbing of the resin is also needed, which may cause a burn to the operator.

Furthermore, an exchange of the blow pin accompanies a centering operation thereof in addition to a mounting and detaching of water and air pipes, which needs hands and time.

The blow molding machine can continuously be operated by automatic control from a start of production of one product to a completion of production thereof, however, it cannot automatically carry out a preparation from a completion of production of one product to a start of production of a next product.

One solution of the problem to an automatic preparation from a completion of production of one product to a start of production of a next product is the use of a so-called robot, which is, however, unsuitable for the blow molding machine due to high cost and required space.

It is, therefore, an object of the present invention to provide a blow molding machine which enables an automatic preparation from a completion of production of one product to a start of production of a next product.

SUMMARY OF THE INVENTION

According to one aspect of the present invention, there is provided a method of controlling a blow molding machine from a completion of production of one product of a resin to a start of production of a next product, the blow molding machine including a plurality of devices, the method comprising the steps of:

controlling a temperature of the resin within the blow molding machine;

controlling an operation of the plurality of devices from the completion of production of the one product of the resin to the start of production of the next product;

controlling a sequent transport of some of the plurality of devices in predetermined positions; and controlling a change of the resin in accordance with a supply stop of the resin and data on the next product.

According to another aspect of the present invention, there is provided an automatic centering equipment for use in a blow molding machine, comprising:

a mold having an upper portion formed with a plurality of openings which are opposite to each other in the diametrical direction;

a source of a fluid;

passage means for providing said fluid to said plurality of openings of said upper portion of said mold;

a sensor arranged in said passage means, said sensor serving to sense predetermined variables of said fluid provided from said plurality of openings;

a blow pin having a centering member, said centering member facing said upper portion of said mold with a predetermined distance when said blow pin is inserted into said mold;

a control unit connected to said sensor, said control unit serving to compare said predetermined variables with each other to obtain differences between every opposite two of said plurality of openings; and an actuator connected to said control unit, said actuator serving to move said blow pin so that said differences are null.

According to still another aspect of the present invention, there is provided a calibrating unit for use in a blow molding machine, comprising:

a first block;

a second block slidably engaged with said first block, said second block having a plurality of blow pins; and a passage means for allowing a fluid communication between said plurality of blow pins,
whereby the height of said plurality of blow pins is automatically adjusted in accordance with a mold by a fluid within said passage means.

According to the other aspect of the present invention, there is provided a calibrating unit for use in a blow molding machine, comprising:

a first block formed with a dovetail groove, said dovetail groove being defined by locking blocks which are movable;

a second block slidably engaged with said dovetail groove; and a third block connected to said second block, said third block having a plurality of blow pins.

DETAILED DESCRIPTION OF THE INVENTION

Figure 1:
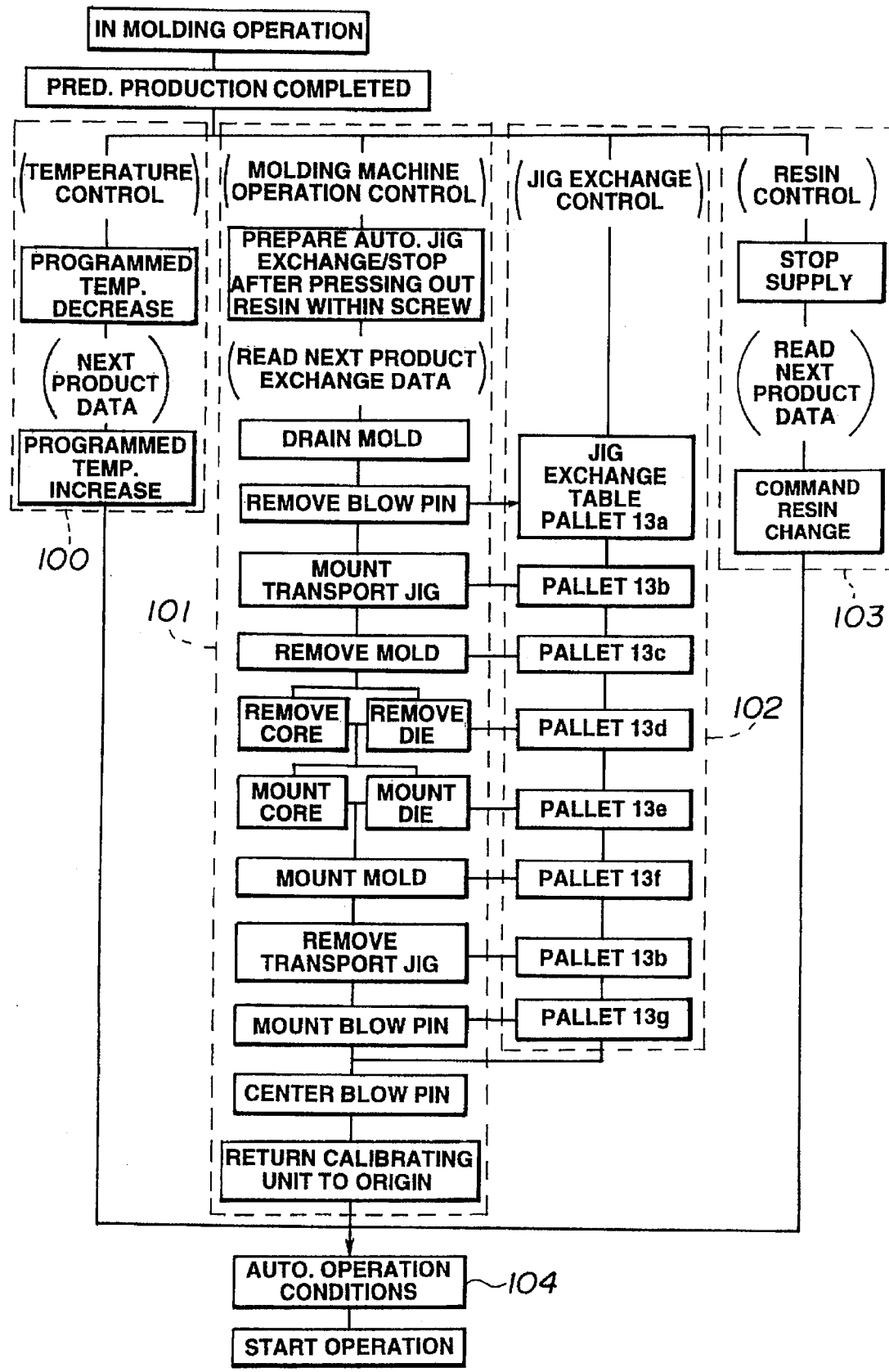
FIG. 1 is a flowchart showing an automatic operation control of a blow molding machine according to the present invention.

Referring to FIG. 1, a temperature control means 100 is provided which controls, after completing a predetermined production amount during a molding operation of a blow molding machine, a programmed temperature decrease and a programmed temperature increase in accordance with a next product data.

When completing a predetermined production amount of an actual product, conditions of a resin of a next product are read out. If a resin is different from an actual one, the resin within a resin supply route should be fully pressed out from the blow molding machine before machine stop.

Due to an automatic feed into a crusher, leaving parisons extruded continuously as it is make the above processing less easy. Therefore, the temperature of the remaining resin within the blow molding machine is decreased after a completion of the production so as to obtain an easy break-away of the resin upon mounting and detaching of a die and core in a next process, which also contributes to a prevention of heat deterioration or carbonization of the resin. Moreover, for an automatic injection into the crusher, an automatic molding is carried out to process the products as an off-specification discharge.

When no remaining resin is found within the material supply route, a hopper and an extruder cylinder, the resin pressure within the extruder cylinder at a pointed end thereof is lowered, which is detected to stop an automatic molding and proceed to a jig exchange.

A blow molding machine operation control means 101 is provided which controls a stop of an extruding screw after pressing out the resin therein, a reading of a next product data, a drainage of a mold which has finished the production, a detaching of a blow pin unit, a mounting of a transport jig, a detaching of the mold by the transport jig, a detaching of the die and core, a mounting of the die and core for the next product, a mounting of the mold for the next product, a detaching of the transport jig, a mounting of the blow pin unit for the next product, a centering of the blow pin, and a returning of a calibrating unit to the origin.

A jig exchange control means 102 is provided which controls a sequent transport of the mold, die, core, and blow pin unit for the next product and the mold, die, core, and blow pin unit to be changed to predetermined optimum positions in accordance with predetermined motions of the transport jig.

A resin control means 103 is provided which controls a resin change command in accordance with a stop of a resin supply and the next product data.

Finally, a global control means 104 is provided which controls the control means 100 to 103 so as to start the production of the next product when all operation conditions in the control means 100 to 103 are satisfied. The control means 100, 103 can easily be formed in the known blow molding machine by applying the known art thereto, whereas the control means 101, 102, 104 cannot be formed in the known blow molding machine. Therefore, it is necessary to improve the blow molding machine.

Figure 2:
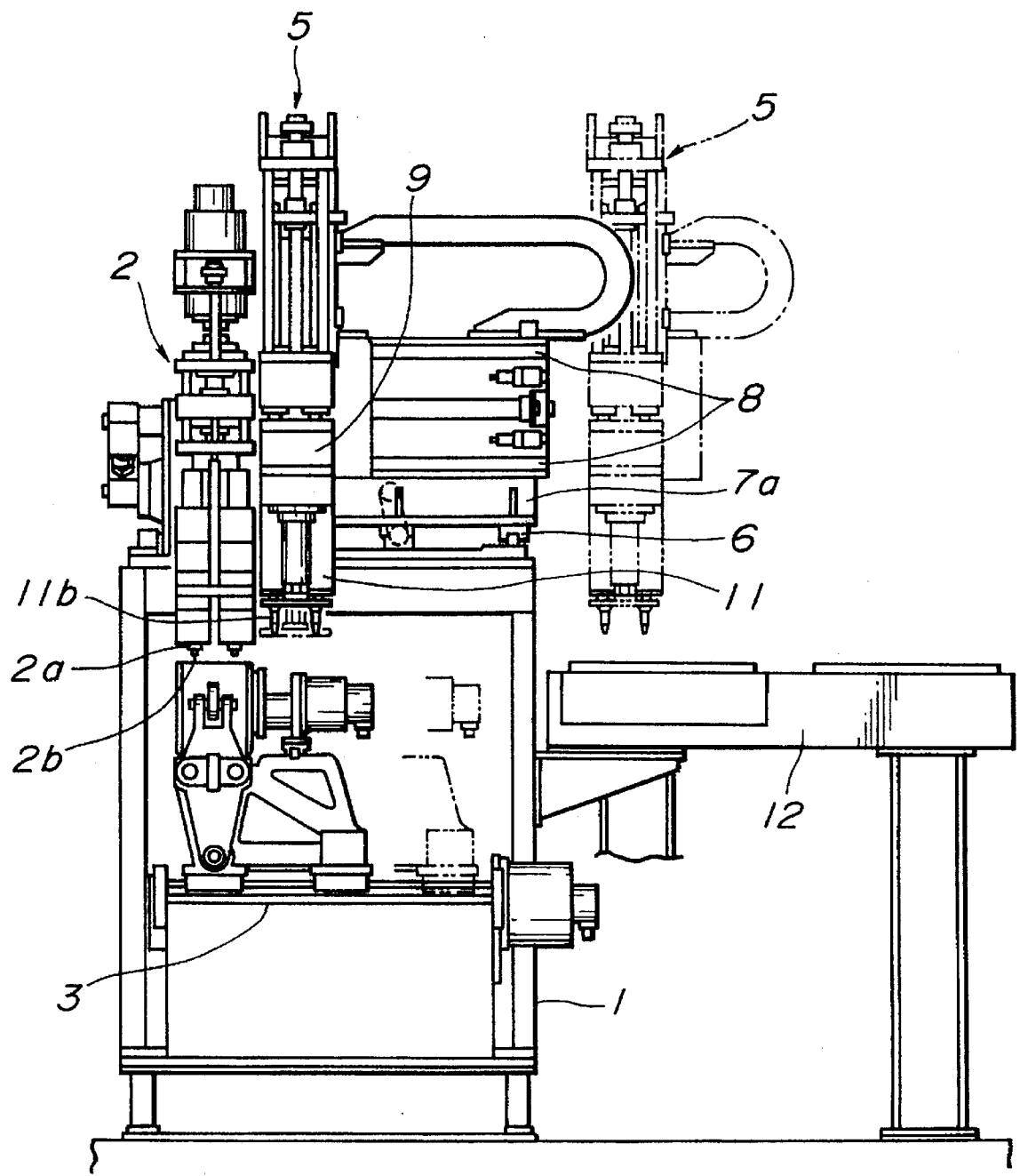
FIG. 2 is a front view showing the blow molding machine.
Figure 3:
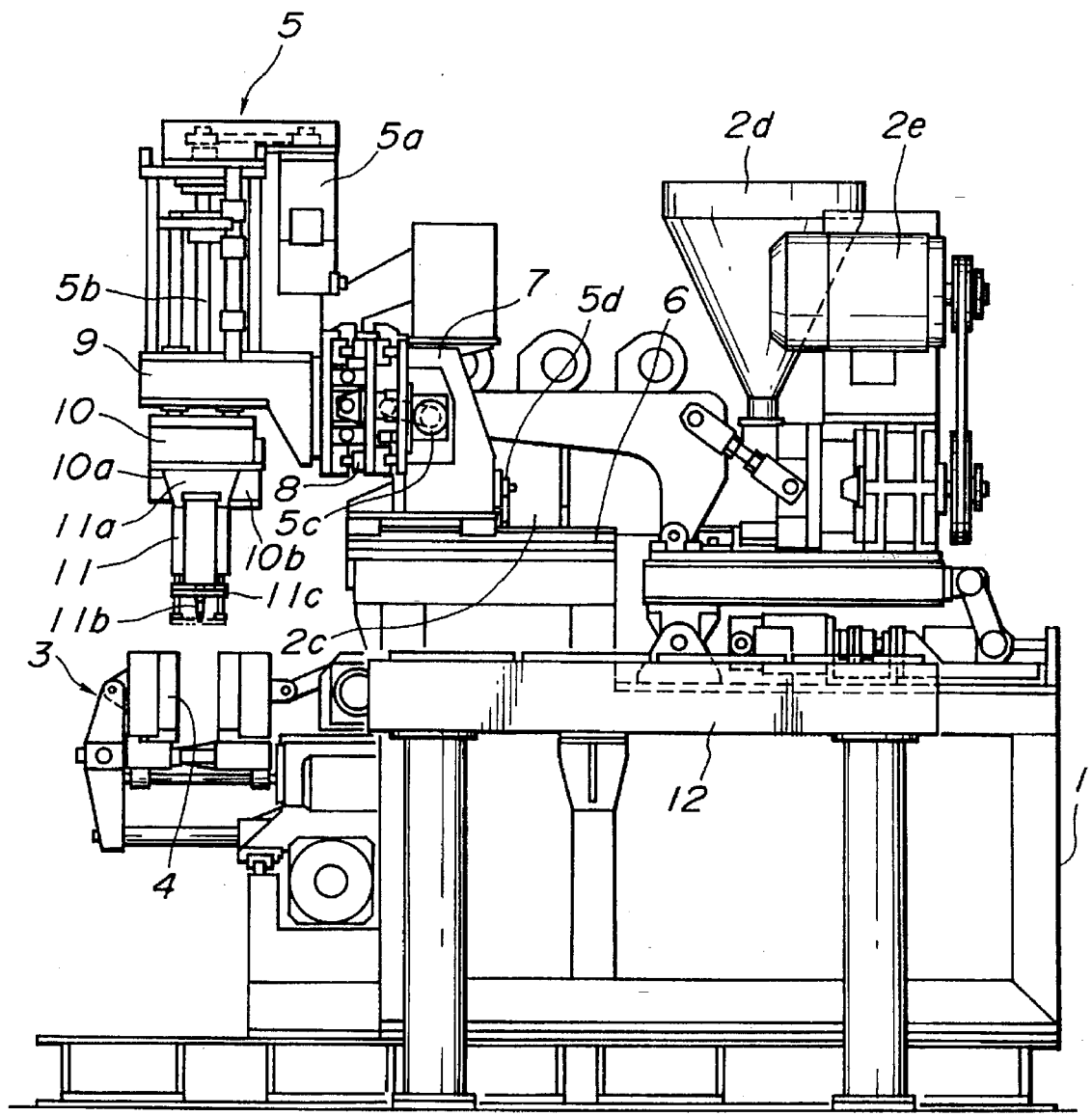
FIG. 3 is a side view showing the blow molding machine.
Figure 4:
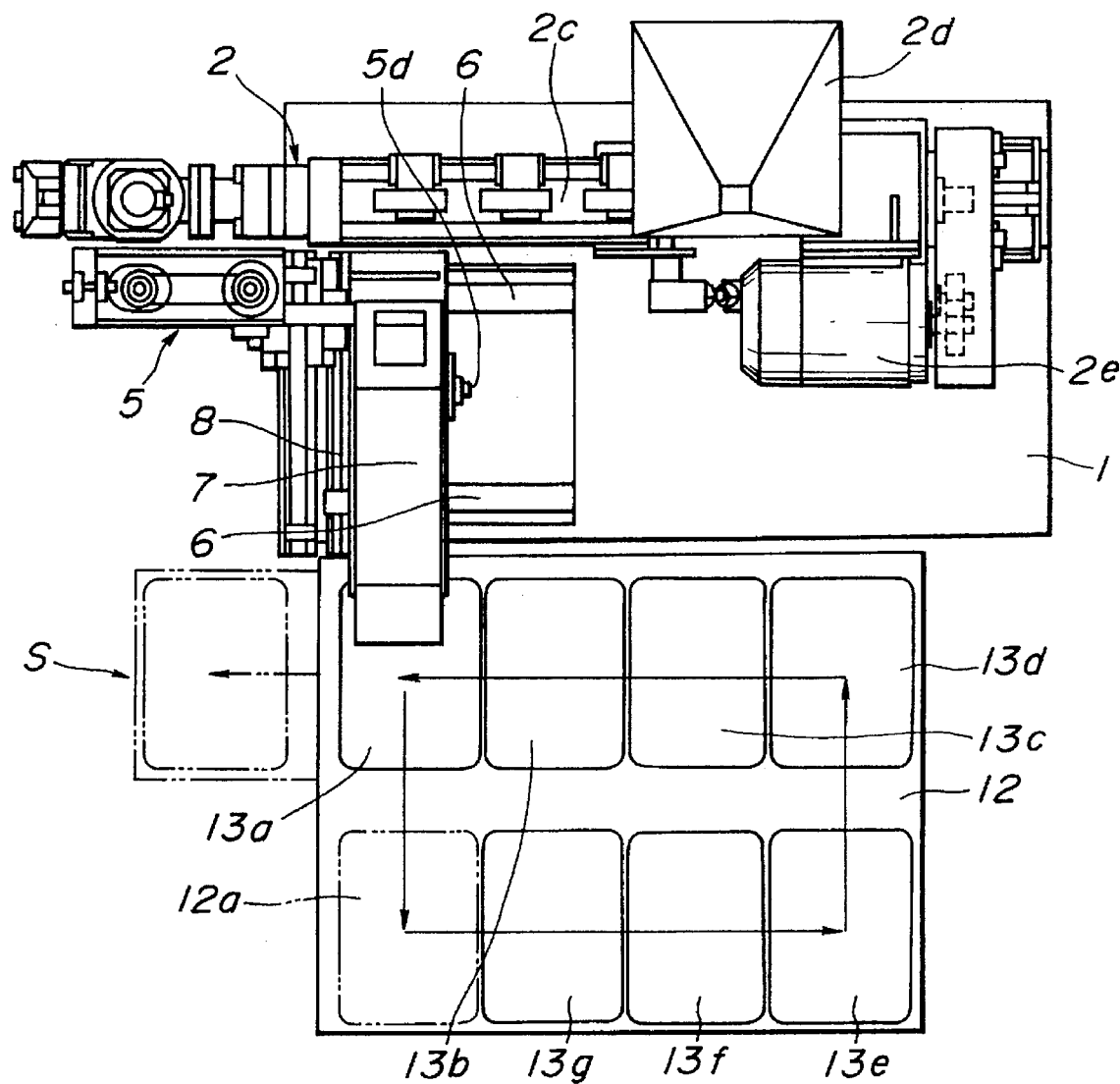
FIG. 4 is a plan view showing the blow molding machine.

Referring to FIGS. 2 to 4, in connection with a forming of the control means 101, 102, a detailed description will be made with regard to an automatic exchange method of the mold and molding jigs in the blow molding machine and a system adopting same.

As best seen in FIGS. 2 and 3, an extruder 2 is mounted on a base 1 of the blow molding machine to be movable upward and downward at a predetermined stroke with respect to a mold 4 which is fixed to a mold clamping unit 3 as movably arranged. A die 2a is detachably arranged to the extruder 2 at the lowest portion thereof by a screw or the like, whereas a core 2b is detachably arranged in the die 2a by a screw or the like.

Parisons having a predetermined thickness which are formed by a combination of the die 2a and the core 2b are pressed out downward, and received in the mold 4 fixed to the mold clamping unit 3. As best seen in FIG. 4, an extruder cylinder 2c for melting the resin to produce the parisons, a hopper 2d for supplying the resin thereto, and a motor 2e for rotating an extruding screw in the extruder cylinder 2c are disposed behind the exturder 2 in the same way as the conventional blow molding machine.

A calibrating unit 5 is disposed adjacent to the extruder 2. As to an installation of the calibrating unit 5, rails 6 are mounted on the base 1, and a support 7 is slidably disposed on the rails 6. As best seen in FIG. 2, the support 7 is formed with a vertical wall 7a having a front face on which rails 8 are mounted in the direction perpendicular to the rails 6. An arm 9 is horizontally movably supported on the rails 8 so as to fix the calibrating unit 5. Thus, the calibrating unit 5 is movable in the longitudinal direction of the base 1 as viewed in FIG. 4 along the rails 6 and in the cross direction of the base 1 as viewed in FIG. 4 along the rails 8. In the same way as the conventional blow molding machine, the calibrating unit 5 has a calibrating head 10 which is movable upward and downward with respect to the mold 4.

Referring to FIG. 3, a motion of the calibrating unit 5 is automatically controlled in a three-dimensional direction: A motion in the vertical direction is carried out by driving a ball screw 5b in the normal and reverse directions by a servo motor 5a, and a motion in the longitudinal and cross directions is carried out by servo motors 5c, 5d, etc. A blow pin unit 11 is detachably mounted to the calibrating head 10 of the calibrating unit 5.

Specifically, as shown in FIG. 3, the calibrating head 10 has a lower portion with an inner ceiling in which a dovetail groove 10a having connection ports for air and water pipes (not shown) is formed, one of the blocks defining the dovetail groove 10a being constructed to be vertically movable, thus obtaining a chuck 10b for holding and releasing the blow pin unit 11 through an air cylinder, etc. On the other hand, the blow pin unit 11 includes an insert portion 11a with a trapezoid section, which is engaged with the dovetail groove 10a and has a lower portion to which a pair of blow pins 11b and a stripper plate 11c are mounted.

Referring to FIG. 2, a jig exchange table 12 is disposed on the right side of the base 1 horizontally and at a predetermined level. As shown in FIG. 4, seven pallets 13 (13a–13g) are arranged on the jig exchange table 12 lengthwise and crosswise so as to secure a vacancy 12a for one pallet, the pallets 13a–13g being capable of circulating on a horizontal plane of the jig exchange table 12.

Figure 8:
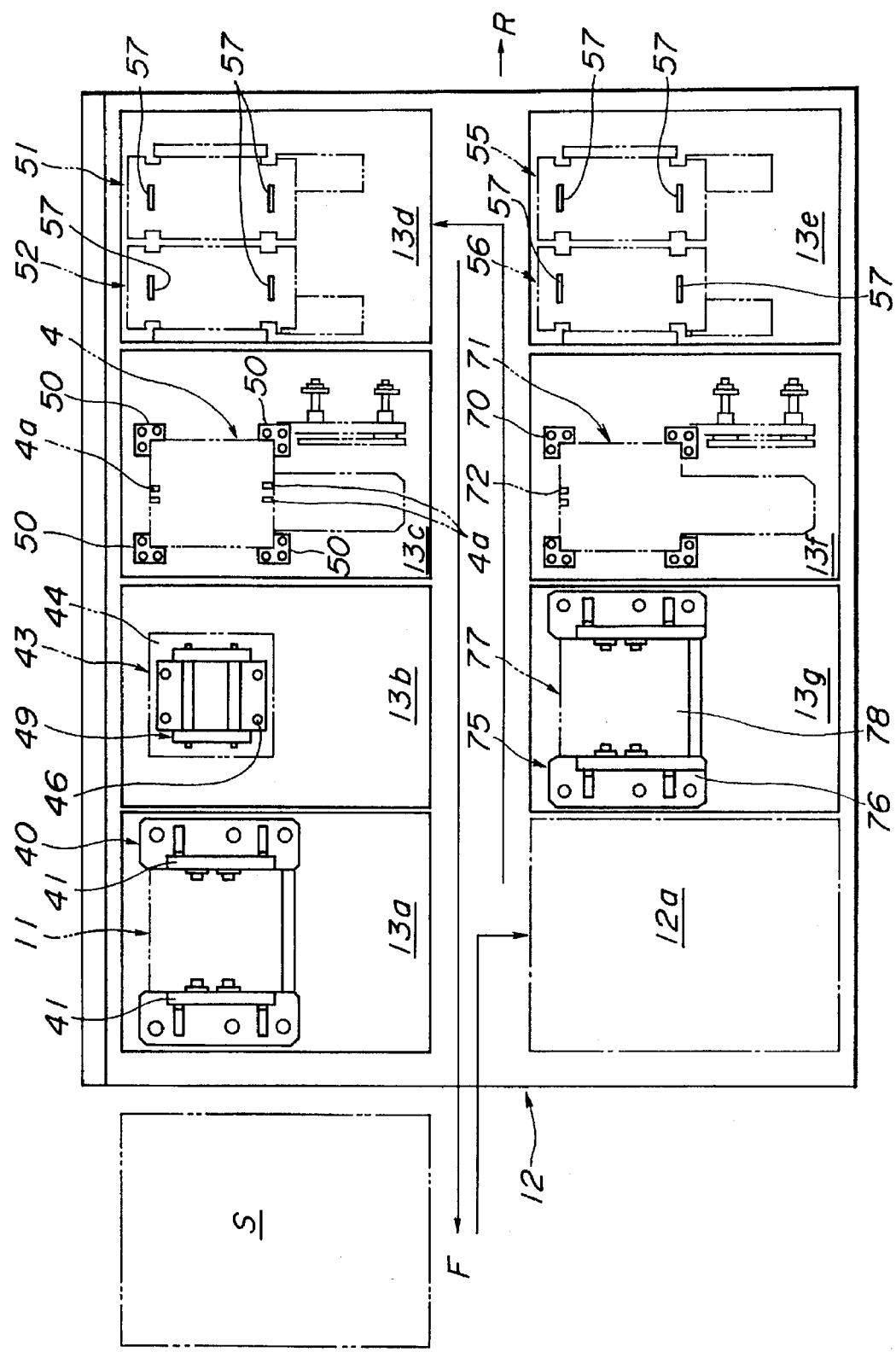
FIG. 8 is a view similar to FIG. 5, showing jigs disposed on the jig exchange table.
Figure 9:
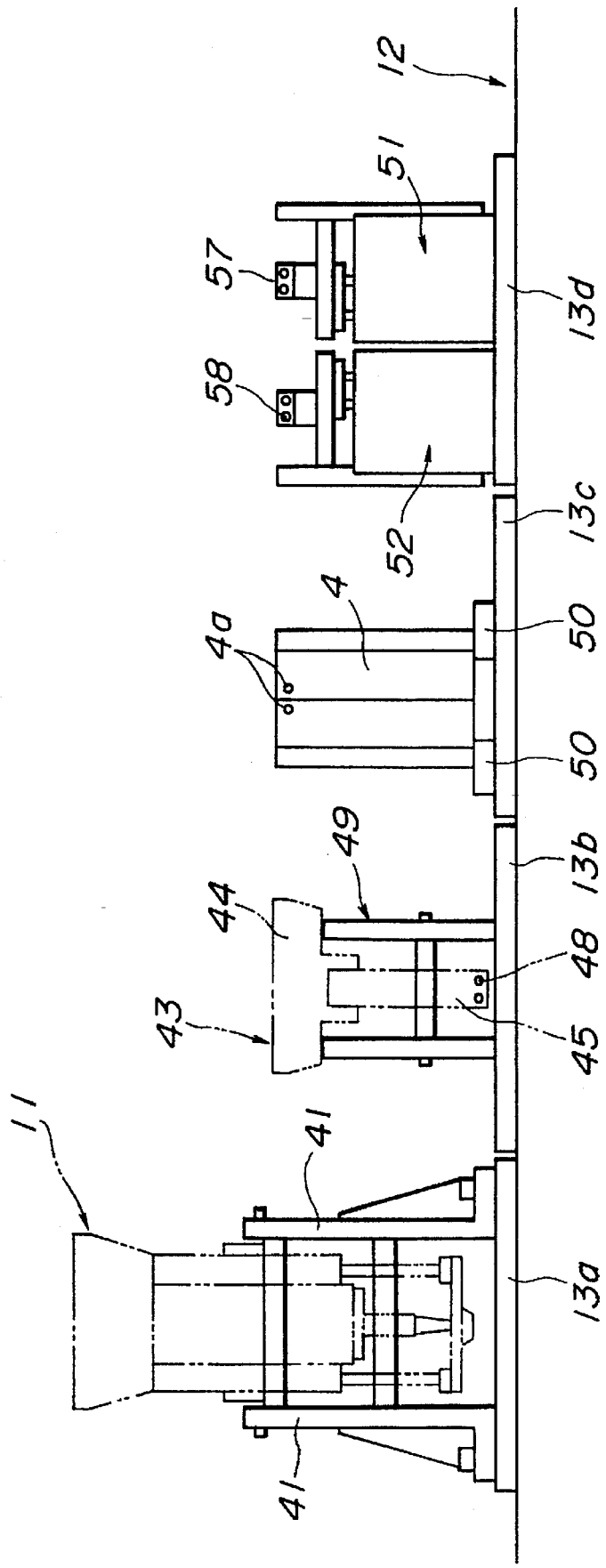
FIG. 9 is a view similar to FIG. 3, showing the jigs disposed on the jig exchange table.

Referring to FIGS. 8 and 9, the pallets 13 are carriers which serve to transport in sequence the mold, molding jigs, etc. disposed thereon to predetermined positions: a blow pin unit bed 40 on the pallet 13a, a transport jig 43 and its bed 46 on the pallet 13b, a mold bed 49 on the pallet 13c, die and core detaching jigs 51, 52 on the pallet 13d, die and core mounting jigs 55, 56 on the pallet 13e, an exchange mold 71 and its bed 70 on the palette 13f, and an exchange blow pin unit 77 and its bed 75 on the pallet 13g.

Figure 5:
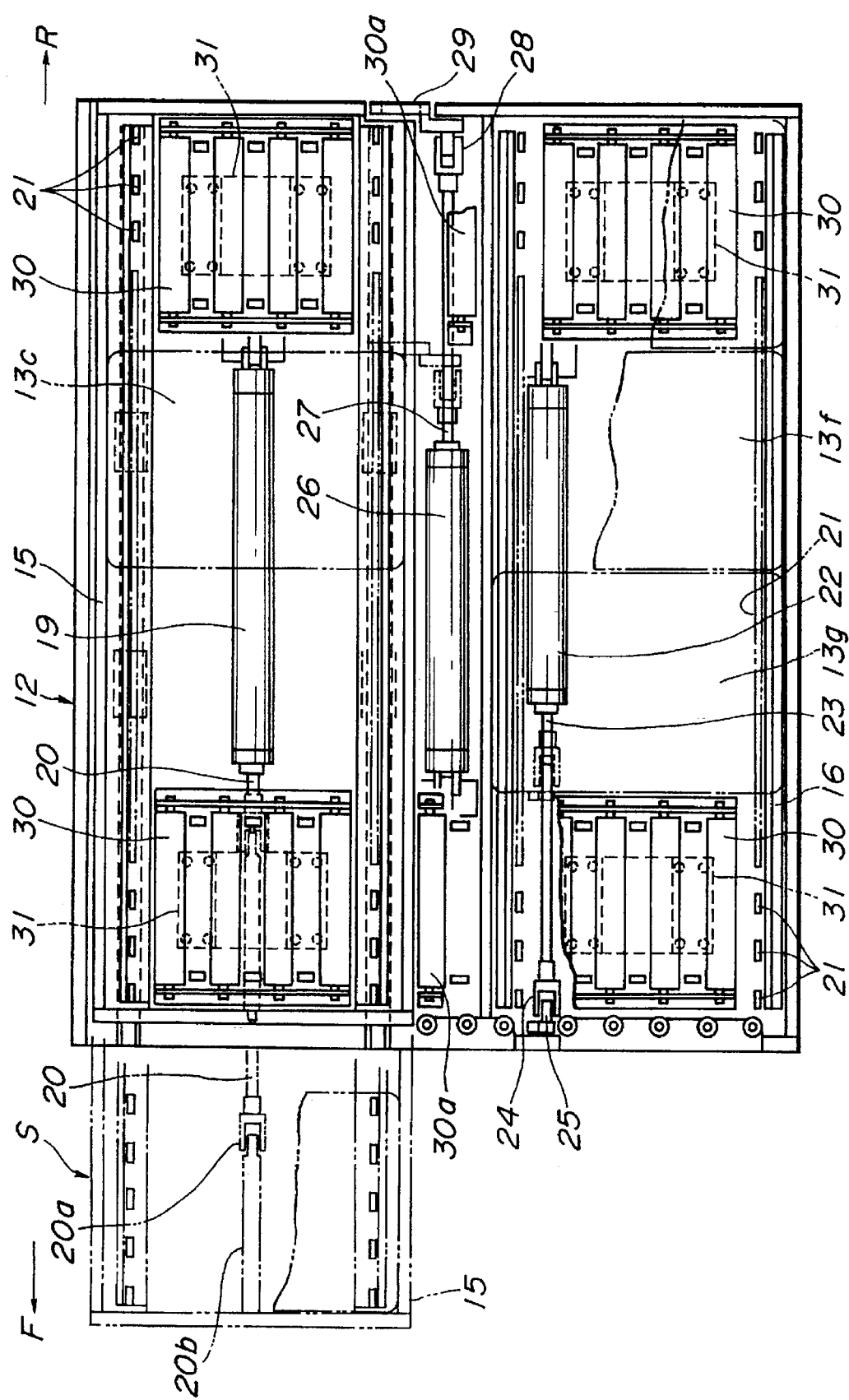
FIG. 5 is a view similar to FIG. 4, showing a jig exchange table.
Figure 6:
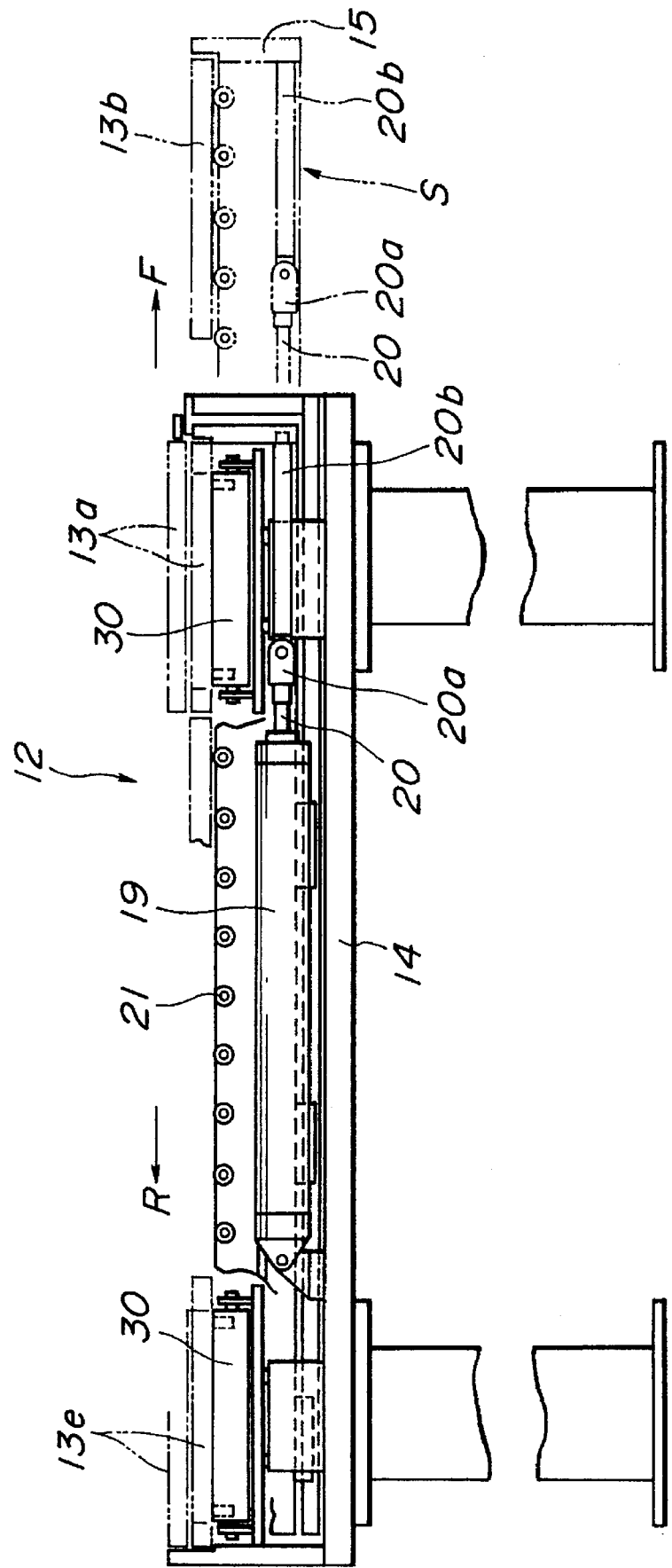
FIG. 6 is a longitudinal section showing the jig exchange table.
Figure 7:
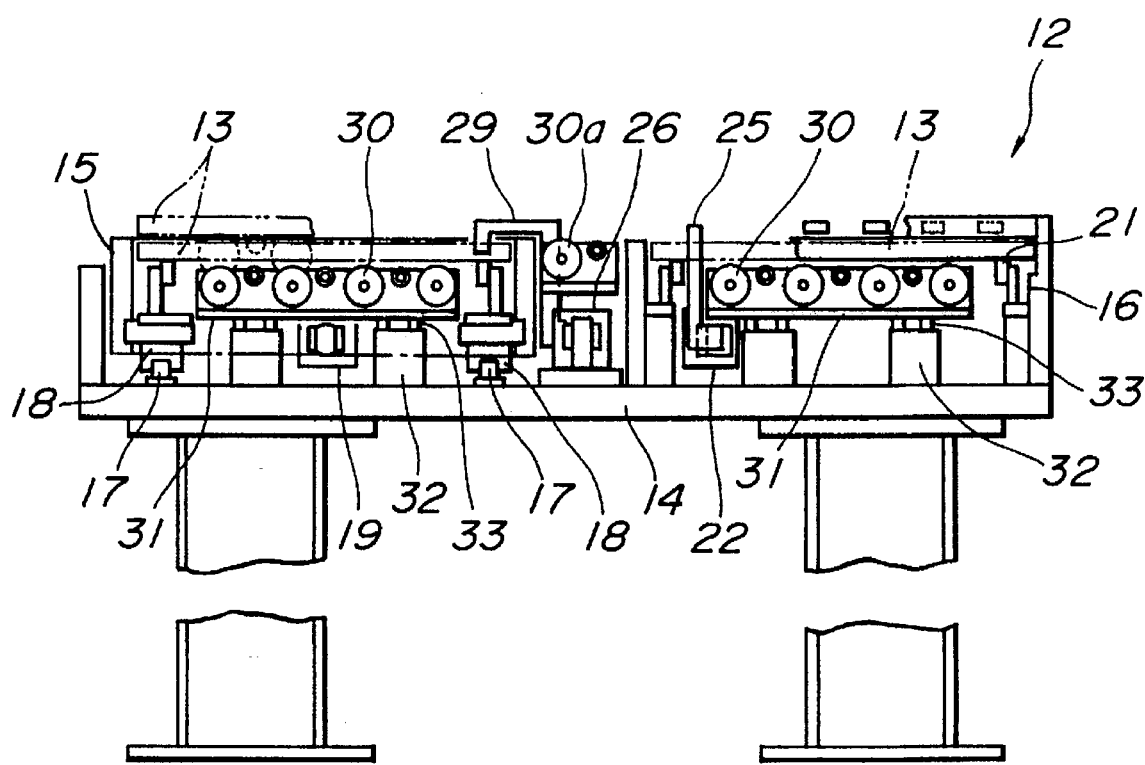
FIG. 7 is a cross section showing the jig exchange table.

Referring to FIGS. 5 to 7, the jig exchange table 12 will be described in detail.

As best seen in FIG. 7, the jig exchange table 12 includes a table main body 14 on which a movable frame 15 and a stationary frame 16 disposed, each frame being formed in a rectangular shape. The movable frame 15 is movable in the longitudinal direction through rollers 18 arranged at a bottom thereof which are rotated on rails 17 disposed on the table main body 14. The stationary frame 16 is appropriately fixed on the table main body 14.

Referring also to FIGS. 5 and 6, a fluid (hydraulic or air) cylinder 19 is fixed to the movable frame 15 in a lower portion thereof, and includes a piston rod 20 connected to the movable frame 15 at a short inner side thereof through a bracket 20a and a rod 20b secured thereto. Thus, the movable frame 15, which is reciprocative in the longitudinal direction, is moved to a front side as indicated by an arrow F in FIGS. 5 and 6 from the table main body 14 at a stroke of one pallet, forming a delivery station S of the jigs, etc. to the calibrating unit 5.

Referring also to FIGS. 5 to 7, a description will be made with regard to the constitution for moving the pallets 13 in the longitudinal direction in the movable frame 15 and the stationary frame 16, respectively.

As best seen in FIG. 5, a roller conveyer is constructed so that a plurality of rollers 21 are rotatably horizontally supported to the movable frame 15 and the stationary frame 16 at long inner sides thereof at predetermined intervals in the longitudinal direction. The pallets 13 are disposed on the rollers 21. Thus, when pressing the pallets 13 when a vacant space for one pallets is found, the pallets 13 are moved by rotation of the rollers 21 in the longitudinal direction of the movable frame 15 or the stationary frame 16, respectively.

As shown in FIGS. 5 and 7, as a means for moving the pallets 13 in the movable and stationary frames 15, 16, a fluid cylinder 22 is fixed on the table main body or under the pallets 13 in the stationary frame 16, and a bracket 24 is connected to an end of a piston rod 23 which is movable forward and backward by the cylinder 22. A vertical push rod 25 extending upward is supported to the bracket 24 to be capable of abutting on a side of the pallet 13.

On the other hand, as a means for moving the pallets 13 in the movable frame 15, a fluid cylinder 26 is fixed to the table main body 14 or under the pallets 13 between the movable frame 15 and the stationary frame 16 and on the long side of the movable frame 15, and a bracket 28 is connected to an end of a piston rod 27 which is movable forward and backward by the cylinder 26. A hook-shaped vertical push plate 29 extending upward is supported to the bracket 24 to be capable of abutting on a side of the pallet 13.

Thus, in the stationary frame 16, the pallets 13 can be moved to a rear side as indicated by an arrow R in FIGS. 5 and 6 since the piston rod 23 is pulled into the cylinder 22 to contact the push rod 25 to the side of the pallet 13. On the other hand, in the movable frame 15, the pallets 13 can be moved to the front side F in FIGS. 5 and 6 since the piston rod 27 is pulled into the cylinder 26 to contact the push plate 29 to the side of the pallet 13. The push rod 25 and the push plate 29 are disposed in a position wherein they are not an obstacle when the pallets 13 are moved from the movable frame 15 to the stationary frame 16 and vice versa.

Referring also to FIGS. 5 to 7, a description will be made with regard to the constitution for moving the pallets 13 between the movable frame 15 and the stationary frame 16.

As best seen in FIGS. 5 and 7, a plurality of bases 31 for supporting motor rollers 30 located below the rollers 21 are arranged at both ends of the movable frame 15 and the stationary frame 16 in the longitudinal direction thereof so as to be movable upward and downward. The motor rollers 30 have an independent drive source, and are rotatable, respectively. Each base 31 is horizontally connected to piston rods 33 at a head thereof to be movable upward and downward, each piston rod 33 being movable forward and backward by a fluid cylinder 32 fixed on the table main body 14.

Moreover, as best seen in FIG. 7, at least one motor roller 30a is interposed between the movable frame 15 and the stationary frame 16, and arranged above the rollers 21. The motor roller 30a has the same constitution as the motor rollers 30, and serves as an intermediary when passing the pallets 13 transported by the motor rollers 30 from the movable frame 15 to the stationary frame 16 and vice versa.

Thus, when the base 31 is raised by drive of the cylinders 32, and reaches a predetermined level so that the motor rollers 30 are on the same horizontal plane as the motor roller 30a, the pallet 13 as disposed on the rollers 21 is separated therefrom, and supported by the motor rollers 30. With a rotation of the motor rollers 30, the pallet 13 is moved by the motor rollers 30, 30a from the movable frame 15 to the stationary frame 16 at a front end of the front side F, and from the stationary frame 16 to the movable frame 15 at a rear end of the rear side R as shown in FIGS. 5 and 6.

Referring to FIGS. 8 and 9, a description will be made with regard to the blow pin unit bed 40, the transport jig 43 and its bed 49, the mold bed 50, the die and core detaching jigs 51, 52, the die and core mounting jigs 55, 56, the exchange mold 71 and its bed 70, and the exchange blow pin unit 77 and its bed 75, which are disposed on the pallets 13.

The blow pin unit bed 40 is a support arranged on the pallet 13a and having an upper side and right and left sides opened, which includes two L-shaped reinforced members 41 arranged opposite to each other with a predetermined distance, and serves to support the blow pin unit 11 which is actually in use by insertion between the members 41.

Figure 10:
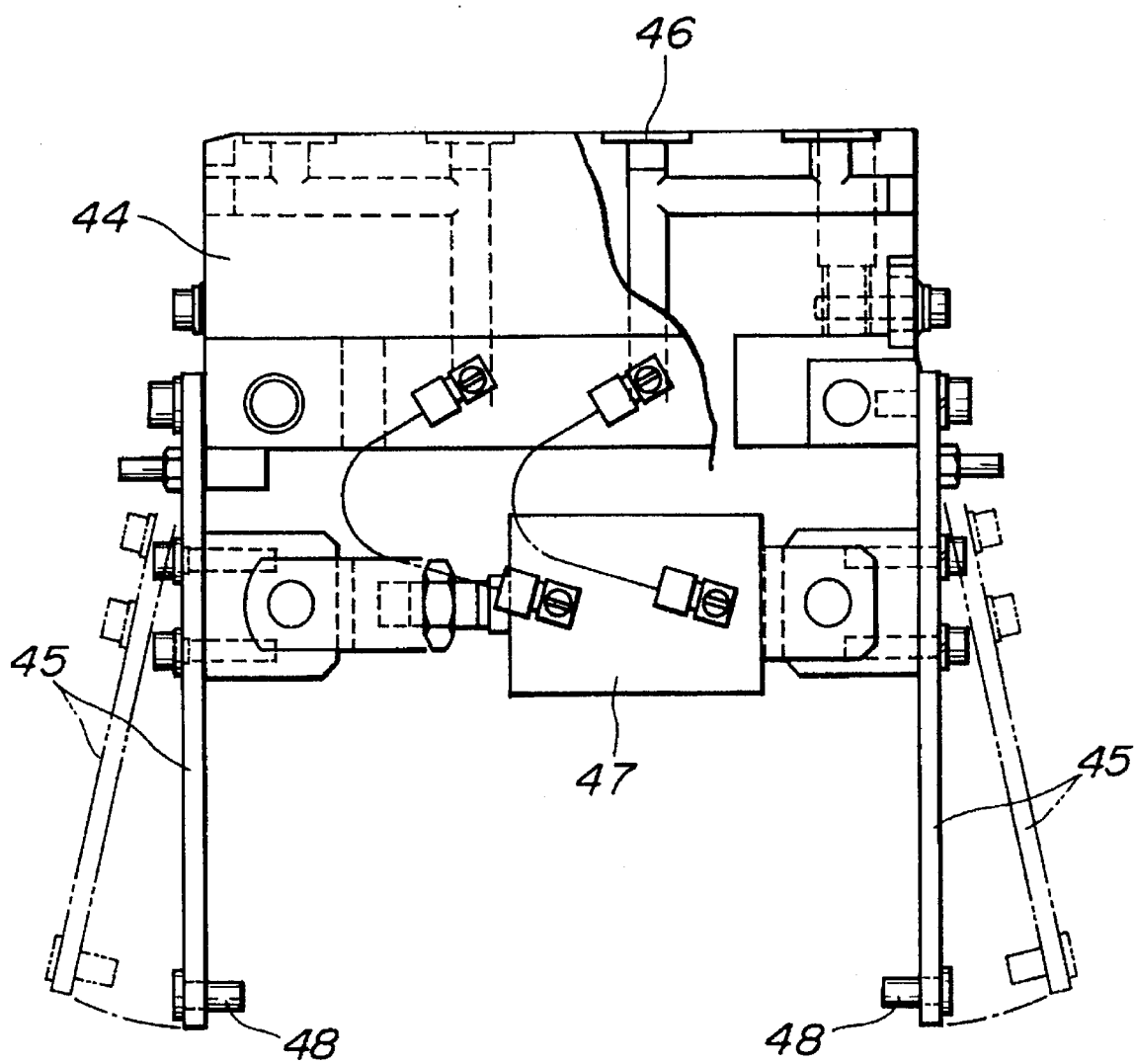
FIG. 10 is a view similar to FIG. 2, showing a transport jig.

The transport jig 43 includes an insert portion 44 which is engaged with the dovetail groove 10a and locked by the chuck 10b, and has both sides as viewed in the cross direction in FIG. 8 to which hands 45 are swingably connected. Referring to FIG. 10, the insert portion 44 has an upper side formed with the air supply ports 46 which communicate with air supply ports having openings in the inner ceiling of the calibrating head 10.

Referring also to FIG. 10, the hands 45 can be opened and closed by a fluid cylinder 47 driven by fluid or air supplied through the air supply ports 46 which allow fluid communication between the insert portion 44 and the calibrating head 10. Pins 48 are arranged to the hands 45 at lower ends thereof and on the sides opposite to each other. The transport jig bed 49 is an U-shaped support arranged on the pallet 13b and an upper side and right and left sides opened, and serves to support the transport jig 43 by insertion between two members in the same way as the blow pin unit bed 40.

The mold ed 50 includes L-shaped stoppers arranged on the pallet 13c, which serve to fix four corners of the mold 4 as actually mounted to the mold clamping unit 3. Both sides of the mold 4 are held by the hands 45, each side being formed with holes 4a for receiving the pins 48 of the hand 45.

The die and core detaching jigs 51, 52 include a die detaching jig 51 and a core detaching jig 52 constructed independently, which are disposed on the same pallet 13d. The die and core mounting jigs 55, 56 include a die mounting jig 55 and a core mounting jig 56 constructed independently, which are disposed on the same pallet 13e. Arranged on upper sides of the die and ore detaching jigs 51, 52 and the die and core mounting jigs 55, 56 are arms 57 which protrude vertically, each having sides formed with holes 58 for receiving the pins 48 of the hand 45.

The die and core detaching jigs 51, 52 are apparatus which serve to disengage from the extruder 2 the die 2a and core 2b which are actually in use, whereas the die and core mounting jigs 55, 56 are apparatus which serve to engage the die and core for the next product with the extruder 2.

The die and core detaching jigs 51, 52 and the die and core mounting jigs 55, 56 include an air cylinder, respectively, which rotates a rotary member biting the die or core to carry out a detaching and mounting operation. Air supply is carried out by the mold clamping unit 3. Alternatively, the rotary member may be driven by an electric motor with a battery.

Figure 11:
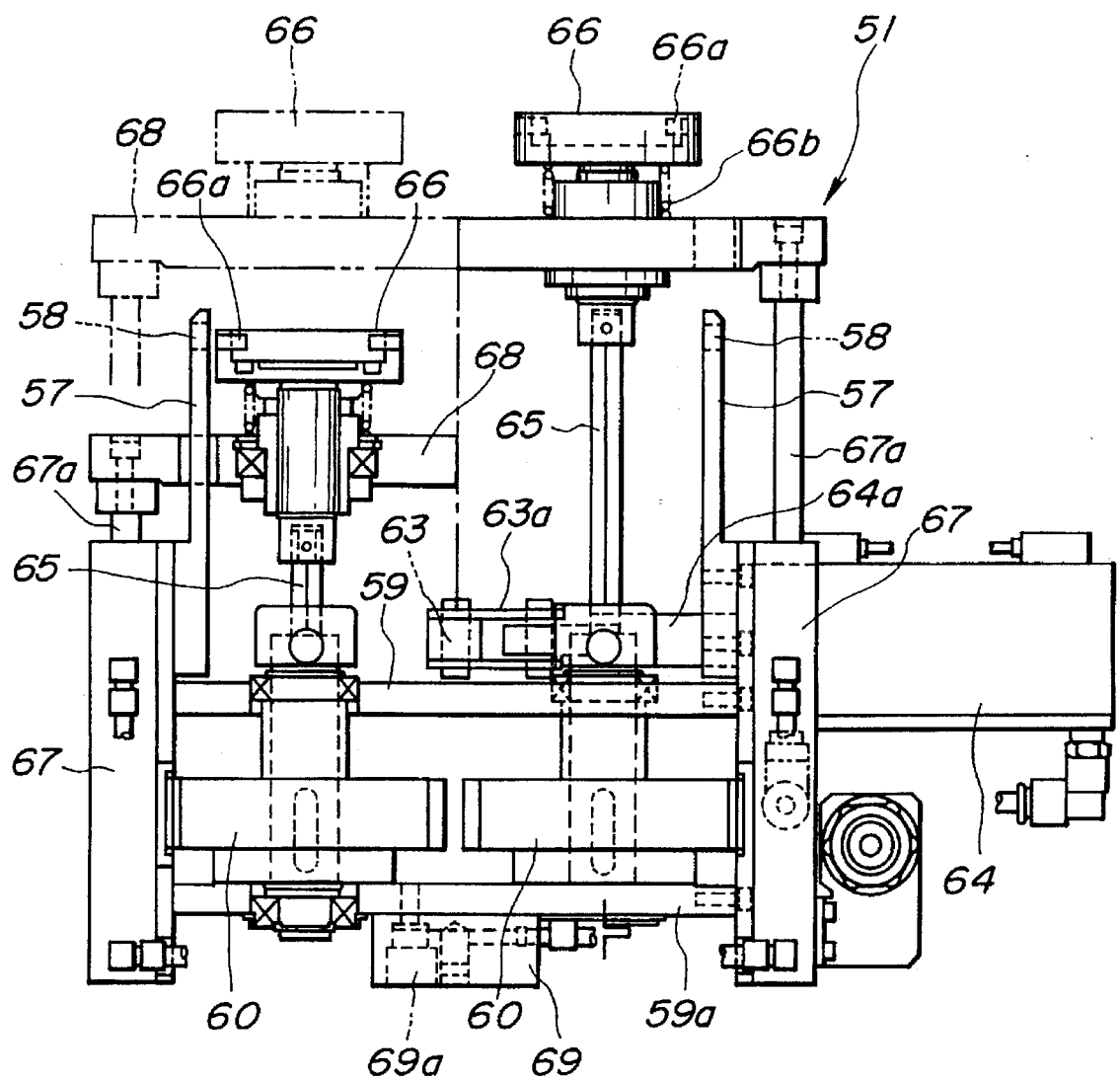
FIG. 11 is a view similar to FIG. 10, partly in section, showing a die and core detaching jig.
Figure 12:
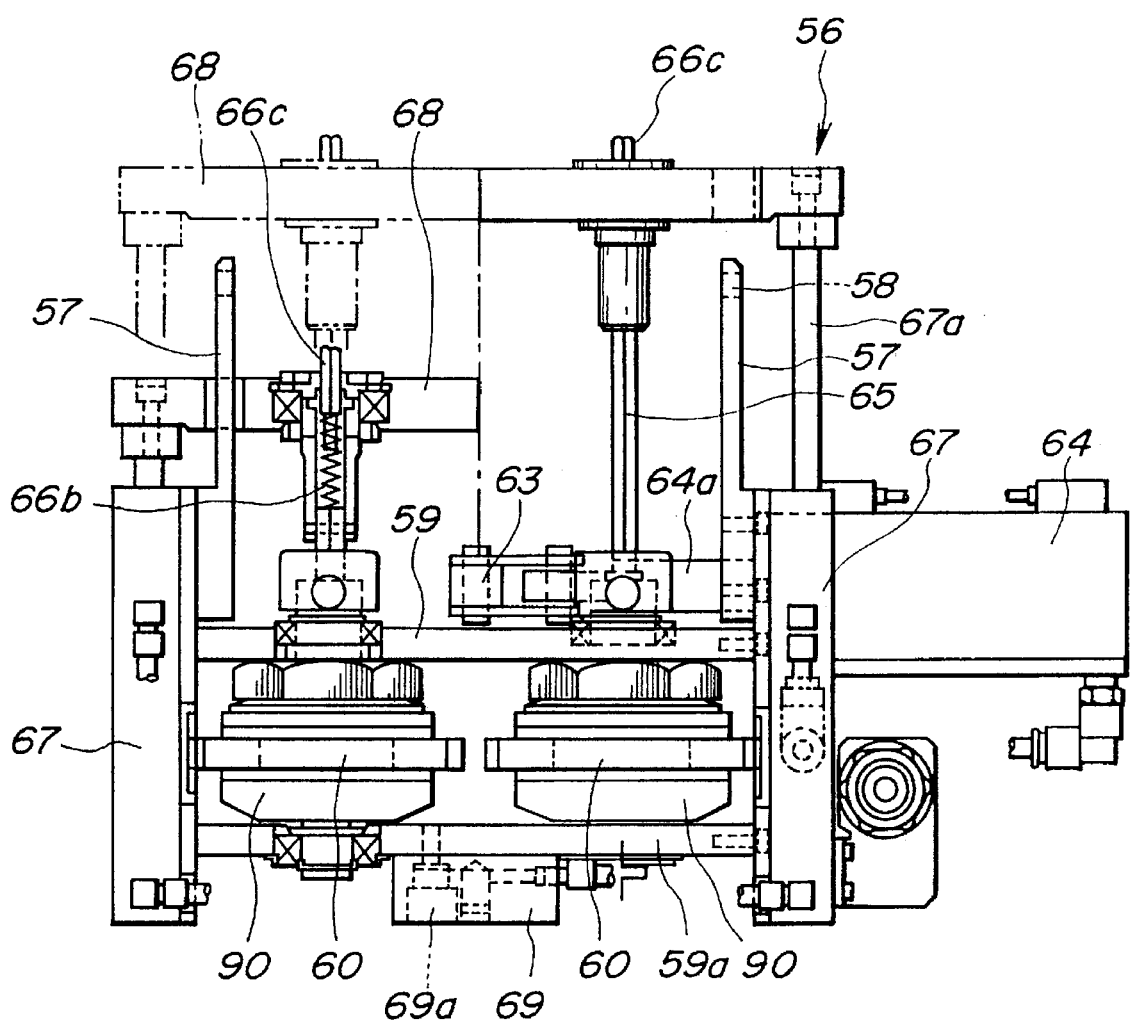
FIG. 12 is a view similar to FIG. 11, showing a die and core mounting jig.
Figure 13:
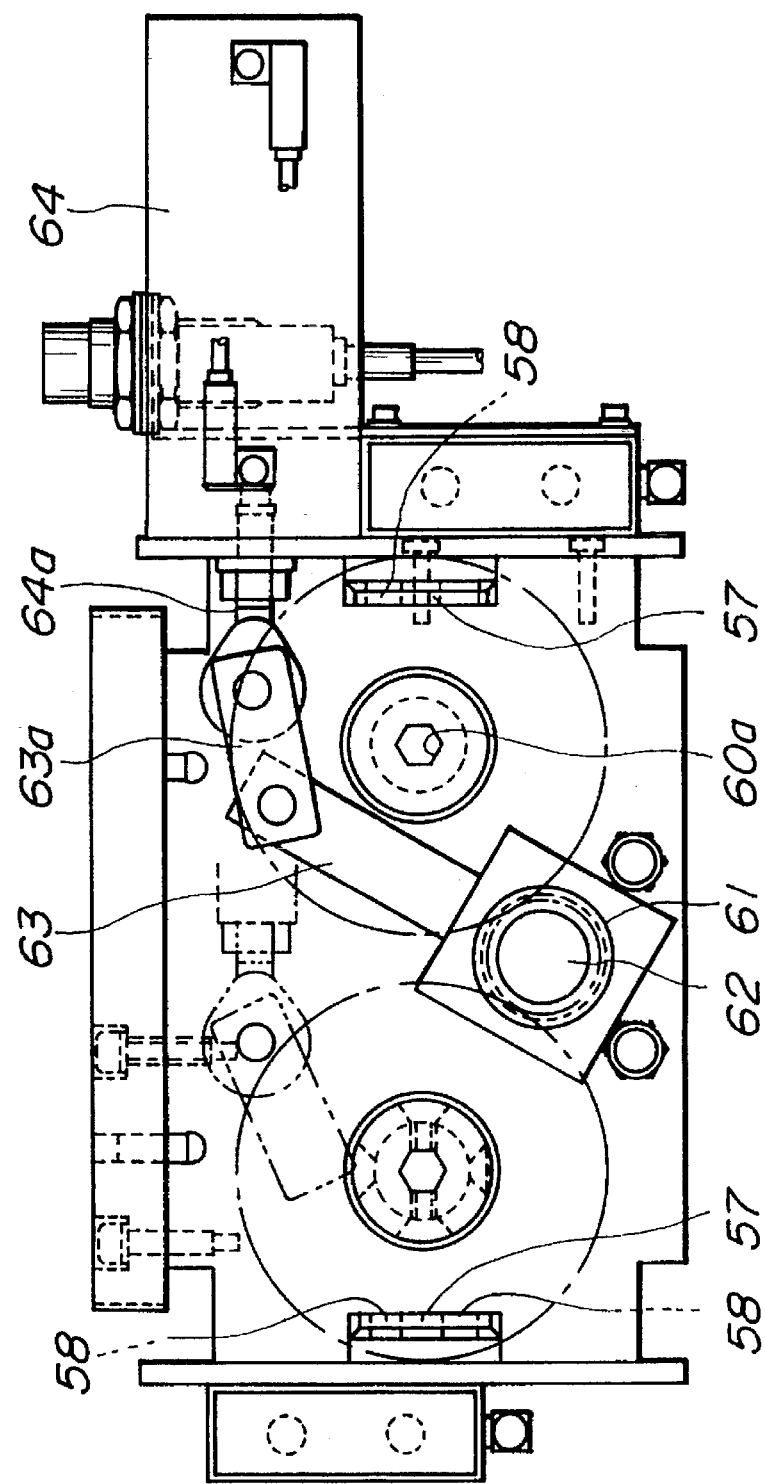
FIG. 13 is a view similar to FIG. 8, showing the die and core detaching jig and the die and core mounting jig.

Referring to FIGS. 11 to 13, a description will be made with regard to examples of the die and core detaching jigs 51, 52 and the die and core mounting jigs 55, 56. FIG. 11 shows a front constitution of the die detaching jig 51 and the die mounting jig 55. FIG. 12 shows a front constitution of the core detaching jig 52 and the core mounting jig 56, and FIG. 13 shows a plane constitution of the die and core detaching jigs 51, 52 and the die and core mounting jigs 55, 56.

With the die detaching jig 51 as shown in FIG. 11 and the core mounting jig 56 as shown in FIG. 12, rotatably supported to a pair of plates 59, 59a interposed between the arms 57 are a pair of gears 60 and a shaft 62 to which a ratchet gear 61 as engaged with the gears 60 is fixed as shown in FIG. 13, and a lever 63 is connected horizontally. A piston rod 64a of a fluid cylinder 64 is connected to the lever 63 through a link 63a. Thus, with a reciprocation of the piston rod 64a, the gears 60 are rotated in the corresponding direction.

Each gear 60 has a center portion formed with a hexagonal shaft hole 60a as shown in FIG. 13, through which a slidable power transmission shaft 65 of, e.g., the hexagonal section type or the spline type is arranged to be moved upward and downward, and has an upper end to which a die engaged portion 66 is connected coaxially. The die engaged portion 66 is in the form of a concave, and has an inner peripheral face on which pins 66a are horizontally oppositely arranged in the diametrical direction. An outer peripheral face of the die 2a is formed with concavities engaged with the pins 66a.

With a core engaged portion for detaching or mounting the core 2b, an exposed head 66c having the form of a hexagonal convex is rotatably arranged above the power transmission shaft 65 in the axial direction thereof as shown in FIG. 12. A lower center portion of the core 2b is formed with a hexagonal concave with which the head 66c is engaged.

Thus, when the die engaged portion 66 or the head 66c is moved upward from below, and engaged with the die 2a or core 2b, the pin 66a or head 66c is engaged with the concave thereof to allow rotation of the die 2a or core 2b. For obtaining an individual engagement of either side of a pair of dies 2a or a pair of cores 2b, a spring 66b is arranged in a lower portion of the die engaged portion 66 to be individually movable upward and downward. The core engaged portion has the same construction.

As shown in FIGS. 11 and 12, for moving a pair of die engaged portions 66 and a pair of heads 66c upward and downward, a plate 68 is arranged at upper ends of four piston rods 67a which are retractable from a pair of fluid cylinders 67 arranged at the side of the arms 57, and a pair of die engaged portions 66 or a pair of heads 68c are rotatably disposed thereon. The fluid cylinders 67 are of the unit type including a pair of cylinders. Thus, the die engaged portions 68 or the heads 66c are movable upward and downward in rotating.

An air supply block 69 is mounted to the plate 59a on a lower side thereof so as to supply air to the fluid cylinders 64, 67. Referring also to FIG. 2, the air supply block 69 has an air supply port 69a which communicates with an air supply port (not shown) arranged in the mold clamping unit 3 when the die and core detaching jigs 51, 52 or the die and core mounting jigs 55, 56 are mounted to the mold clamping unit 3, so that air is distributed from the air supply port 69a to the fluid cylinders 64, 67 through pipe.

It is to be noted that since the core mounting jig 56 as shown in FIG. 12 has the same constitution as the die detaching jig 51 as shown in FIG. 11 except torque limiters 90, like reference numerals are given to like parts and a duplicate description thereof is omitted. Each torque limiter 90 is integrally formed with the gear 60, and races when the gear 60 goes over a predetermined tightening torque, preventing a unnecessary tightening of the die 2a or core 2b. As is not shown, the torque limiter 90 is also arranged to the die mounting jig 55.

Referring again to FIG. 8, the exchange mold bed 70, which is approximately the same as the mold bed 50, includes hook-shaped stoppers arranged on the pallet 13f, which serve to fix four corners of the mold 71 for the next product, thus securely supporting the mold 71 on the exchange mold bed 70. Both sides of the mold 71 are held by the hands 45, each side being formed with holes 72 for receiving the pins 48 of the hand 45.

Finally, the exchange blow pin unit bed 75 is a support arranged on the palette 13g and having an upper side and right and left sides opened, which includes two L-shaped members 76 arranged opposite to each other with a predetermined distance, and serves to support the blow pin unit 77 for the next product by insertion between the members 76. The blow pin unit 77 is the same as the blow pin unit 11 which is actually in use, and has an insert portion 78 provided with connection ports which communicate with the air and water pipes of the calibrating unit 10.

Obviously, there are provided in various parts detection means such as a limit switch, sensor, etc. for detecting positions of the extruder 2, the mold clamping unit 3, the calibrating unit 5, and the jig exchange table 12 which are operated for a jig exchange as well as safety means for confirming the detection means.

Figure 14:
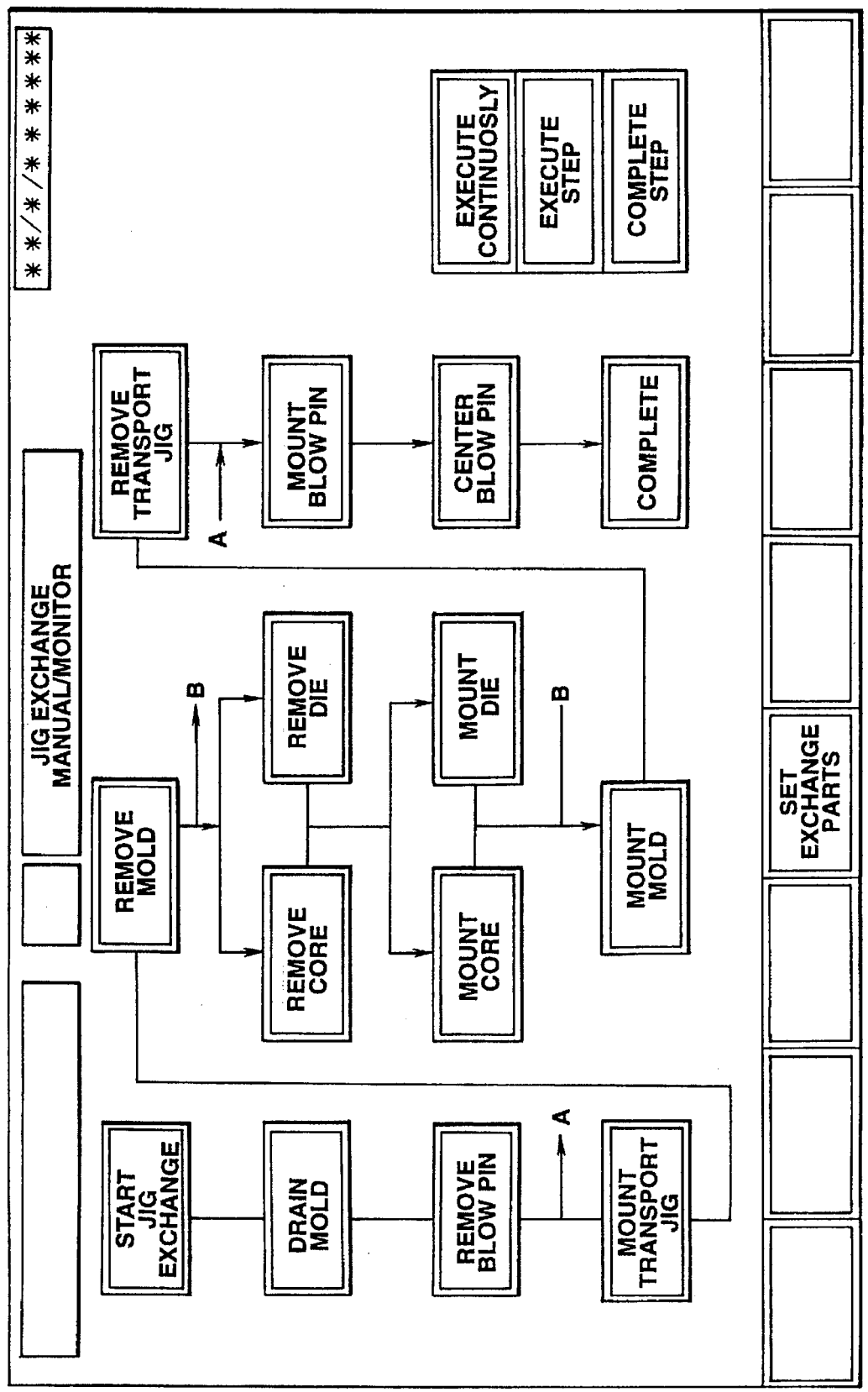
FIG. 14 is a view similar to FIG. 1, showing a jig exchange operation indicated on a monitor display of a controller.

Referring next to FIG. 14, an automatic exchange of the mold and molding jigs will be described. When completing a predetermined production amount of a product which is actually in molding, the extruder 2 is stopped after pressing out the resin therein, and an automatic jig exchange preparation is carried out. Then, the control means 101 reads a data necessary to the next product. First, as shown in FIG. 14, a drainage of the mold 4 which is in use is carried out, then a detaching of the blow pin unit 11 which is in use is started.

Specifically, referring to FIG. 2, the support 7 is withdrawn from above the mold 4 along the rails 6, then the calibrating unit 5 is moved rightward as viewed in FIG. 2 or to the jig exchange table 12 along the rails 8. On the other hand, referring to FIG. 5, the jig exchange table 12 already moves the movable frame 15 to the front side F by operation of the cylinder 19, having a protrusion corresponding to one pallete 13 from the stationary frame 16. Thus, referring also to FIG. 8, the blow pin unit bed 40 as disposed on the pallet 13a is positioned in the delivery station S.

Therefore, referring to FIG. 3, when the calibrating unit 5 approaches the blow pin unit bed 40 to insert the insert portion 11a of the blow pin unit 11 as actually mounted into the blow pin unit bed 40 as shown in FIGS. 8 and 9, the chuck 10b of the calibrating unit 5 is released to open the dovetail groove 10a, and the blow pin unit 11 is disengaged from the calibrating head 10, and disposed on the blow pin unit bed 40. The calibrating unit 5 is slightly withdrawn to the initial position so as to have a wait for a mounting of the transport jig 43 subsequent to the blow pin unit 11.

Then, the movable frame 15 is withdrawn to be in line with the stationary frame 16, and the pallet 13a as disposed on the blow pin unit bed 40 is moved to the vacancy 12a on the stationary frame 16 as shown in FIG. 8. Specifically, referring also to FIG. 7, when the cylinders 32 on the front side F of the movable frame 15 and the stationary frame 16 are operated so that the motor rollers 30 are on the same level as the motor roller 30a, the pallet 13a is separated from the rollers 21, and supported by the motor rollers 30. Thus, when the motor rollers 30, 30a are rotated, respectively, the pallet 13a is moved from the movable frame 15 to the stationary frame 16, obtaining a vacant space at the front end of the movable frame 15.

When the pallet 13a supporting the blow pin unit 11 is moved o the stationary frame 16, the motor rollers 30 are moved to the initial position by operation of the cylinders 32, so that the pallet 13a is supported by the rollers 21 of the stationary frame 16. Thus, referring to FIG. 8, four pallets 13a, 13g, 13f, 13e are disposed on the stationary frame 16, which is in a full load state.

On the other hand, as best seen in FIGS. 5 and 6, when the piston rod 27 is withdrawn by operation of the cylinder 26 so as to move the pallet 13b having the transport jig 43 thereon to the front end of the movable frame 15 with a vacant space, the push plate 29 contacts the side of the pallet 13d on the rear side R of the movable frame 15 so as to press the pallet 13d to the front side F. Thus, a vacant space is formed at the rear end of the movable frame 15.

Then, referring to FIGS. 7 and 8, when the cylinders 32 on the rear side R of the movable frame 15 and the stationary frame 16 are operated to raise the bases 31, and the motor rollers 30 are on the same level as the motor roller 30a, the pallet 13e as located at the rear end of the stationary frame 16 is separated from the rollers 21, and supported by the motor rollers 30. Thus, when the motor rollers 30, 30a are rotated, respectively, the pallet 13e is moved from the stationary frame 16 to the movable frame 15, obtaining a vacant space at the rear end of the stationary frame 16.

As best seen in FIGS. 5 and 8, when the piston rod 23 is withdrawn by operation of the cylinder 22 so as to move the pallet 13f to the vacant space of the stationary frame 16, the push rod 25 contacts the side of the pallet 13a at the front end of the stationary frame 16, thereby moving the three pallets 13a, 13g, 13f to the rear end of the stationary frame 16, obtaining again the vacancy 12a at the front end of the stationary frame 16.

In such a way, the subsequent pallets 13b–13g on the jig exchange table 12 are transported one by one to the front end of the movable frame 15, and the pallets 13b–13g as located at the front end of the movable frame 15 are transported to the stationary frame 16. Therefore, the pallets 13a–13g can be circulated on the jig exchange table 12 by a circulation means which comprises the cylinders 19, 22, 26 and the motor rollers 30, 30a.

Referring to FIGS. 5 and 8, for making the calibrating head 10 hold the transport jig 43 located at the front end of the movable frame 15, the cylinder 19 is operated to press the movable frame 15 to the front side F, locating the transport jig 43 in the delivery station S.

Then, referring to FIG. 3, the waiting calibrating unit 5 is moved to the transport jig 43 so that the insert portion 44 of the transport jig 43 is engaged with the dovetail groove 10a. The chuck 10b is operated to mount the transport jig 43 to the calibrating head 10, allowing a fluid communication of the air supply ports 46, obtaining the hands 45 which are in the operable state. The calibrating unit 5 having the transport jig 43 mounted is returned to the initial calibrating position.

On the other hand, the mold clamping unit 3 holding the mold 4 which is in use is operated to position the mold 4 just under the calibrating unit 5, and waits for a detaching of the mold 4. The mold clamping unit 3 may be operated upon molding in the same way as the conventional method.

Referring to FIGS. 8 and 9, when the positions of both sides of the mold 4 correspond to those of the hands 45, the calibrating unit 5 is moved downward or to the mold 4, which is held by the hands 45. A sure holding of the mold 4 is detected when the pins 48 of the hands 45 are inserted into the holes 4a of the mold 4, so that the calibrating unit 5 is moved upward or to the initial position in lifting the mold 4 through the transport jig 43, and displaced again to the jig exchange table 12.

Then, the calibrating unit 5 disposes the mold 4 on the mold bed 50 on the palette 13c subsequent to the front end of the movable frame 15 which is positioned in the delivery station S. In the vicinity of the jig exchange table 12, the calibrating unit 5 waits for a next holding operation with the transport jig 43 mounted.

The mold bed 50 having the mold 4 thereon is transported to the stationary frame 16 in the way as described above, and the pallets 13d having the die and core detaching jigs 51, 52 thereof is transported to the front end of the movable frame 15. Moreover, the movable frame 15 is moved to the front side F so as to position the pallet 13d in the delivery station S.

For mounting the die and core detaching jigs 51, 52 in the delivery station S, the waiting calibrating unit 5 approaches the die detaching jig 51, which is held through the transport jig 43, and transported in the way as described above, then fixed to the mold clamping unit 3. As best seen in FIG. 2, the mold clamping unit 3 is moved below the extruder 2, and part of the die detaching jig 51 is moved upward or to the extruder 2 so as to hold, rotate and remove the die 2a.

Part of the die detaching jig 51 holding the die 2a as removed is moved downward, and the die detaching jig 51 is returned to the initial state. The mold clamping unit 3 is also returned to the initial state, and positioned below the calibrating unit 5. The die detaching jig 51 is held and moved upward by the calibrating unit S through the hands 45 of the transport jig 43, and returned to the initial position on the jig exchange table 12.

Subsequent to completion of a detaching of the die 2a, the core detaching jigs 2 is held by the transport jig 43, and transported to the mold clamping jig 3 for fixing. The core detaching jig 52 is moved below the extruder 2 by the mold clamping unit 3, and part of the core detaching jig 52 is moved upward to hold, rotate and remove the exposed core 2b.

When part of the core detaching jig 52 holding the core 2b as removed is moved downward or to the initial state, the mold clamping unit 3 is returned to the initial state, and positioned below the calibrating unit 5. The core detaching jig 52 is held and moved upward by the calibrating unit 5 through the hands 45 of the transport jig 43, and returned to the initial position on the jig exchange table 12 for a wait.

Referring to FIGS. 5 and 8, the die detaching jig 51 holding the die 2a and the core detaching jig 52 holding the core 2b are transported to the stationary frame 16 in the way as described above. The pallet 13e having the die and core mounting jigs 55, 56 thereon is transported to the front end of the movable frame 15, which is moved to the front side F so as to position the pallet 13e in the delivery station S.

In the same way as the die and core detaching jigs 51, 52, the die and core mounting jigs 55, 56 are transported to the mold clamping unit 3 for fixing so as to mount the die and core for the next product to the extruder 2.

The pallet 13e having the die and core mounting jigs 55, 56 thereon is transported to the stationary frame 16 in the same way as described above. The pallet 13f having the mold bed 70 supporting the mold 71 for the next product is transported to the front end of the movable frame 15, which is moved to the front side F so as to position the mold 71 in the delivery station S.

Then, the mold 71 is held by the transport jig 43 of the calibrating unit 5, which is moved to fix the mold 71 to the mold clamping unit 3. Meanwhile, the movable frame 15 is withdrawn to be in line with the stationary frame 16. The pallets 13f, 13g, 13a are transported to the stationary frame 16, and the pallet 13b is positioned at the front end of the movable frame 15.

Then, the calibrating unit 5 is returned to the jig exchange table 12 so as to dispose the transport jig 43 on the transport jig bed 46 on the pallet 13b moved at the front end of the movable frame 15, and has a wait.

After transporting the pallet 13b having the transport jig 43 and its bed 46 thereon to the stationary frame 16, and also transporting the pallets 13c, 13d, 13e, 13f one by one, the pallet 13g having the blow pin unit 77 to be changed is moved to the front end of the movable frame 15, which is moved so as to position the blow pin unit 77 in the delivery station S.

The calibrating unit 5 is moved to the jig exchange table 12 so as to insert the insert portion 78 of the blow pin unit 77 into the dovetail groove 10a of the calibrating head 10, obtaining a fluid communication of the air and water supply pipes, and an operation and lock of the chuck 10b.

The calibrating unit 5 is returned to the blowing position where it faces the mold clamping unit 3. When finishing a positional adjustment of the calibrating unit 5, i.e., a centering of the blow pins 11b of the calibrating unit 5 returned to the blowing position with blow ports of the mold 71 fixed to the mold clamping unit 3, a preparation for the next product is completed.

Figure 15:
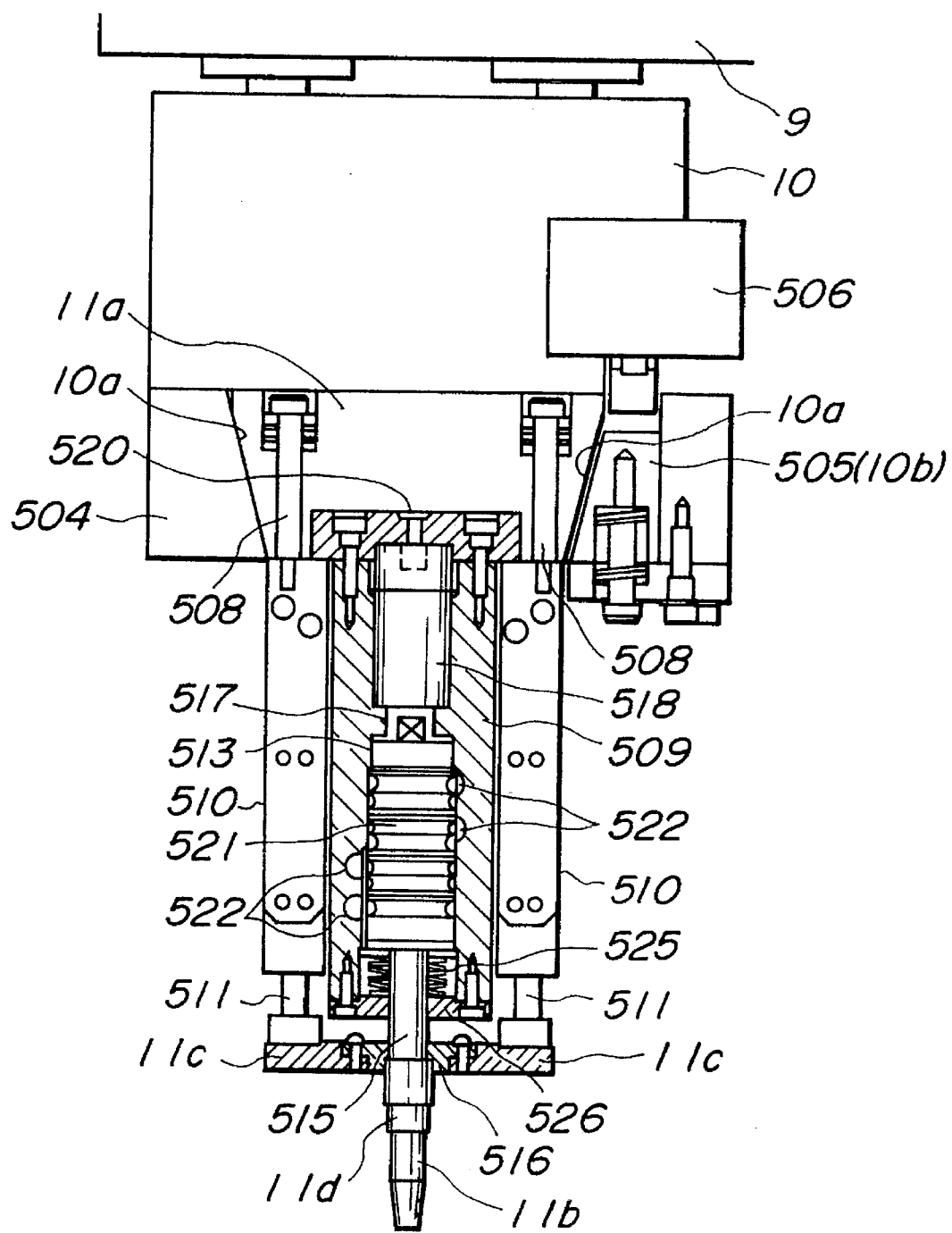
FIG. 15 is a view similar to FIG. 7, showing a calibrating unit.

Referring to FIGS. 15 to 18, a description will be made with regard to a mechanism for an exchange and height adjustment of the blow pins 11b and a flash pressing in the calibrating unit 5. As best seen in FIG. 15, locking blocks 504, 505 are arranged to form the dovetail groove 10a in the calibrating head or first block 10 which is vertically movably arranged in connection with the arm 9. The locking block 504 is fixed to the calibrating head 10, whereas the locking block 505 is hung to be vertically movable through an air cylinder 506 fixed to the calibrating head 10, forming the chuck 10b.

Vertically arranged is the insert portion or second block 11a having substantially the form of a trapezoid and engaged with the dovetail groove 10a. A center block or third block 509 and right and left cylinders 510 are vertically connected thereto through bolts 508. The cylinders 510 are supported by the center block 509 in side portions thereof as shown in FIG. 17, and the stripper plate 11c is horizontally connected to piston rods 511 at lower ends thereof.

Figure 16:
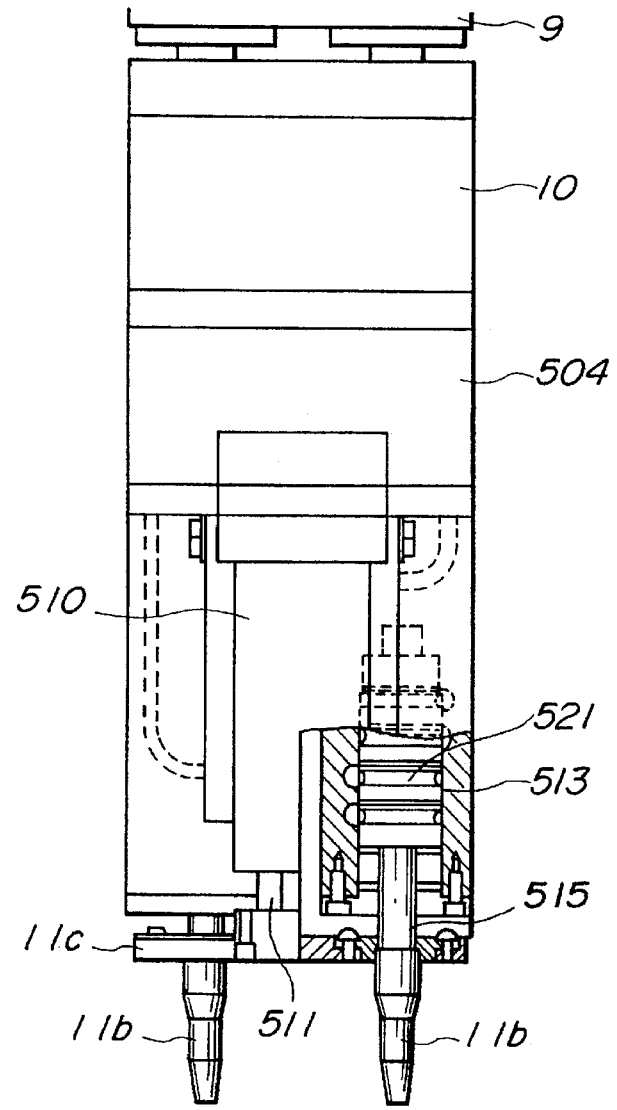
FIG. 16 is a view similar to FIG. 6, partly in section, showing the calibrating unit.

Referring also to FIG. 16, the center block 509 is formed with a pair of cylinder chambers 513 in the positions corresponding to the piston rods 511, and nozzle bodies 515 each connected to the blow pin 11b are vertically movably received therein. The blow pin 11b is arranged through a stripper bush or centering member 516 fixed to the stripper plate 11c so as to extend downward.

A cylinder 518 is connected to the nozzle body 515 at an upper end thereof through a piston rod 517, and filled with a fluid such as oil or grease via a communication passage 520 formed in the center block 509. The communication passage 520 allows a fluid communication between the pair of cylinder chambers 513, which serves to operate both cylinders 518 together.

Figure 17:
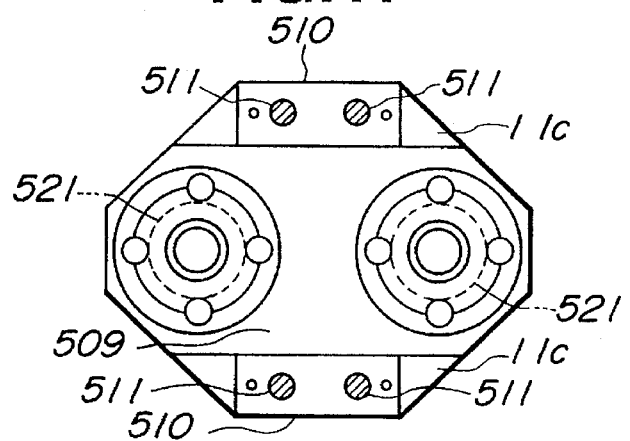
FIG. 17 is a view similar to FIG. 13, partly in section, showing the calibrating unit.
Figure 18:
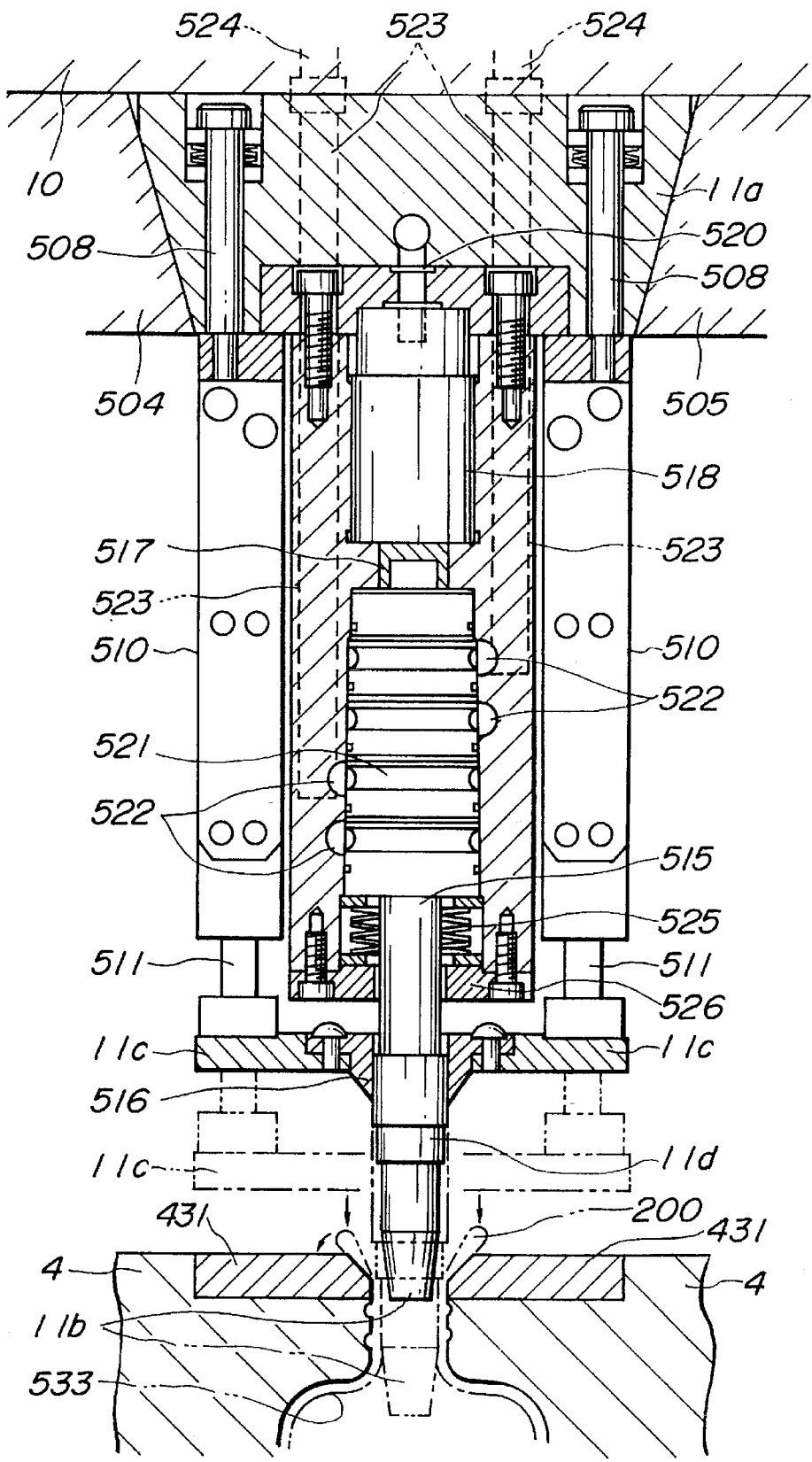
FIG. 18 is an enlarged cross section showing the calibrating unit.

Referring to FIGS. 17 and 18, manifold 521 is fixed to the nozzle body 515 in an upper portion thereof so as to face a plurality of discharge ports 522 formed in an inner wall of the cylinder 513, respectively. The discharge ports 522 are openings of passages 523 formed in the center block 513, each passage 523 having an opening at an upper face of the insert portion 11a. The calibrating head 10 is formed with passages 524, each having an opening corresponding to the passage 523.

The passages 523, 524, which serve to discharge air and cooling water, have an opening to the manifold 521, respectively, so as to communicate with a passage in the nozzle body 515. An O-ring is interposed between the openings of the passages 523, 524 for sealing. Circulation passages are provided for air and cooling water. A plurality of belleville springs 525 are arranged on the side of a lower end of the nozzle body 515, and received in the cylinder chamber 513, and supported by an end plate 526 through which the blow pin 11b is vertically movably arranged.

Next, referring also to FIGS. 15 to 18, the operation of the above mechanism will be described. As best seen in FIG. 15, for fixing the calibrating unit 5 to the calibrating head 10, the locking block 505 is moved downward by drive of the air cylinder 506 to enlarge the dovetail groove 10a. The insert portion 11a is slid into and engaged with the dovetail groove 10a so that the passages 523, 524 correspond to each other. Then, the locking block 505 is moved upward by drive of the air cylinder 506 to contact the dovetail groove 10a, tightly fixing the insert portion 11a to the calibrating head 10.

Referring to FIGS. 16 and 18, the mold 4 holding the parisons and fixed to the mold clamping unit 3 is moved to be statonarily positioned under the blow pins 11, then the calibrating head 10 is moved downward to insert the blow pins 11b into openings of cutting plates 431 of the mold 4, making cutting sleeves 11d of the blow pins 11b contact a cutting plates 431, respectively.

In case one cutting sleeve 11d does not correctly contact the cutting plate 431, as soon as the other cutting sleeve 11d contacts the cutting plate 431 the corresponding nozzle body 515 is pressed up so as to move the cylinder 518 upward, so that a fluid within one cylinder 518 flows into the other cylinder 518 via the communication passage 520.

Therefore, the piston rod 517 of the other cylinder 518 is moved downward to press down the nozzle body 515, pressing the blow pin 11b into the mold 4 so as to correctly contact the cutting sleeve 11d with the cutting plate 431. Thus, an automatic adjustment of both blow pins 11b is carried out, and the cutting sleeves 11d are pressed against the cutting plates 431 by an equal force so as to cut flashes 200, respectively.

For a blow molding, air is injected from the blow pin 11b to the parison in the mold 4, obtaining the flash 200 protruding from the cutting plate 431. The stripper plate 11c is moved downward or to the cutting plate 431 by drive of the cylinder 510 so as to press the flash 200. The flash 200 protruding from the cutting plate 431, which is still soft due to simple air cooling, is pressed, squashed and cooled by the stripper plate 11c and the mold 4 as cooled.

After being slightly moved upward to separate the cutting sleeve 11d from the cutting plate 431, the calibrating head 10 is moved upward again, which causes an upward movement of the blow pin 11b with the flash 200 stuck thereto. The stripper plate 11c is moved downward, thus dropping the flash 200 through the stripper bush 516. For a next molding operation, the flash 200 as fully cooled is suitably eliminated without any bad influence on a product 533 such as a sticking and any dispersion in all directions.

Figure 19:
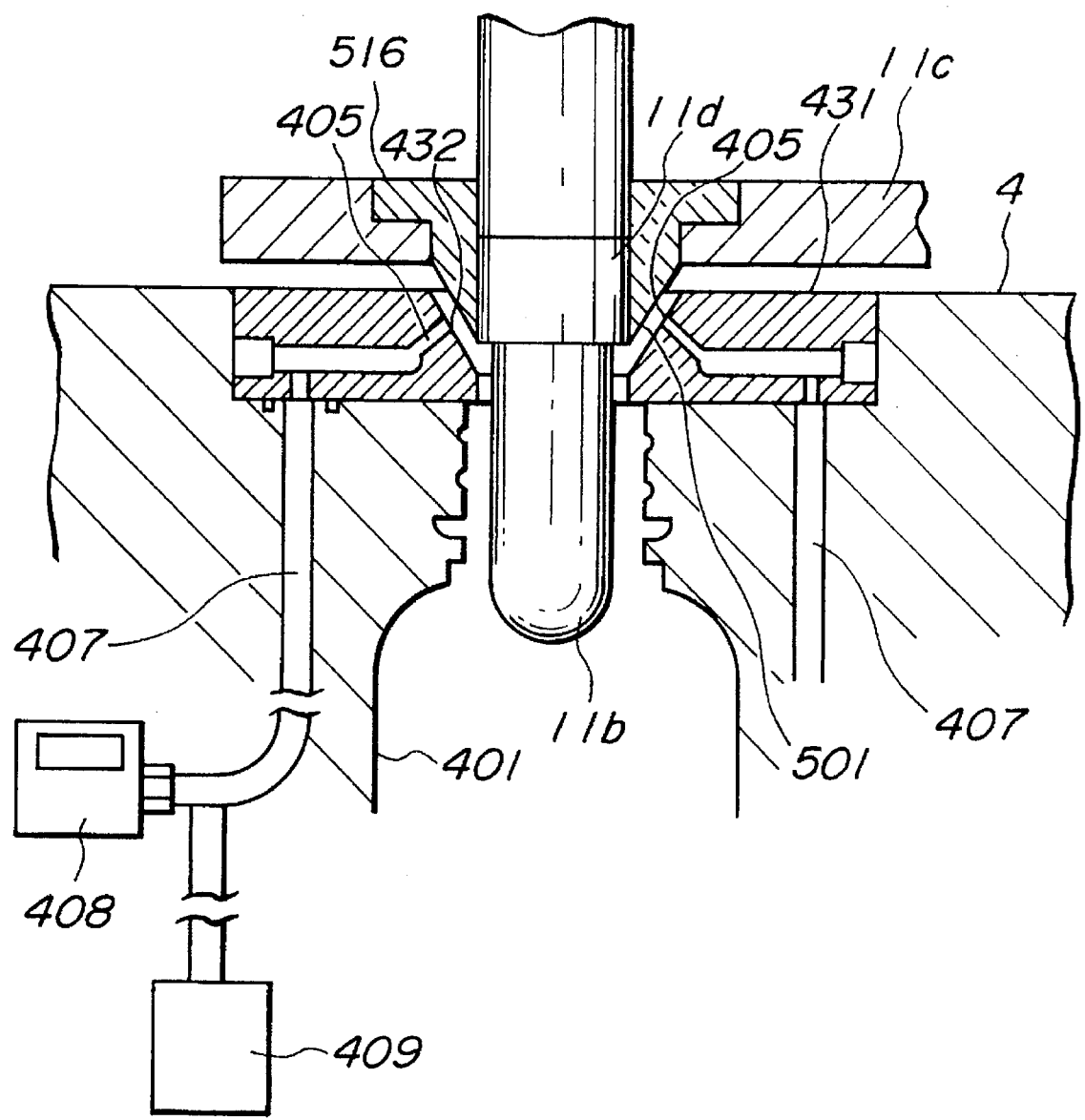
FIG. 19 is a sectional view showing an automatic centering equipment.
Figure 20:
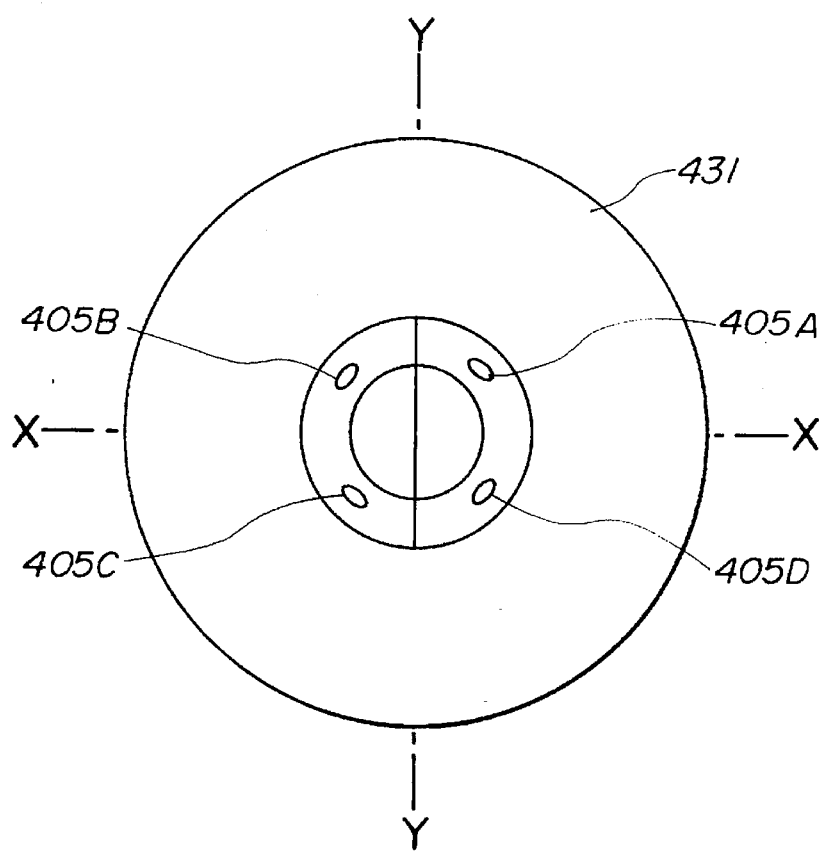
FIG. 20 is a view similar to FIG. 1, showing a cutting plate of the automatic centering equipment.
Figure 21:
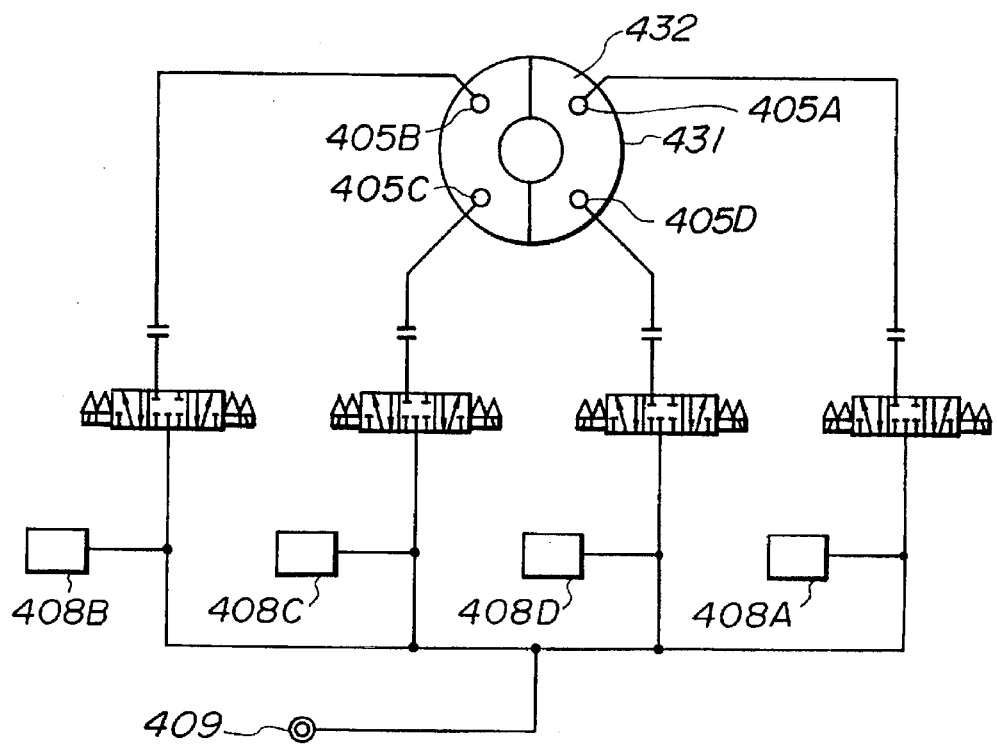
FIG. 21 is a diagrammatic view showing an example of the constitution of air passages.

Referring to FIGS. 19 to 21, an example of an automatic centering equipment for forming the control means 104 will be described. As shown in FIG. 19, the blow pin 11b and the stripper bush 516 are inserted into the cutting plate 431 of the mold 4, the blow pin 11b being inserted into an opening of a cavity 401. The stripper bush 516 is a conical tubular body which is fixed to the stripper plate 11c so as to support the blow pin 11b arranged therethrough, and has a lower outer peripheral face protruding from the stripper plate 11c or a conical outer peripheral face 501. The conical outer peripheral face 501 is a face parallel to a conical inner peripheral face 432 of the cutting plate 431. As best seen in FIG. 20, the cutting plate 431 is formed with a plurality of blowout openings 405A–405D, every couple thereof facing each other in the diametrical direction. Each blowout opening 405A–405D is arranged in the conical inner peripheral face 432 of the cutting plate 431 as shown in FIG. 19.

Referring to FIGS. 19 and 21, connected to the blowout openings 405A–405D are passages 407 formed in the mold 4, to which pressure sensors 408A–408D and a supply source 409 of a fluid such as air are connected in turn, respectively. It is to be noted that the pressure sensors 408A–408D may be replaced with flow sensors having an analog output.

Figure 22:
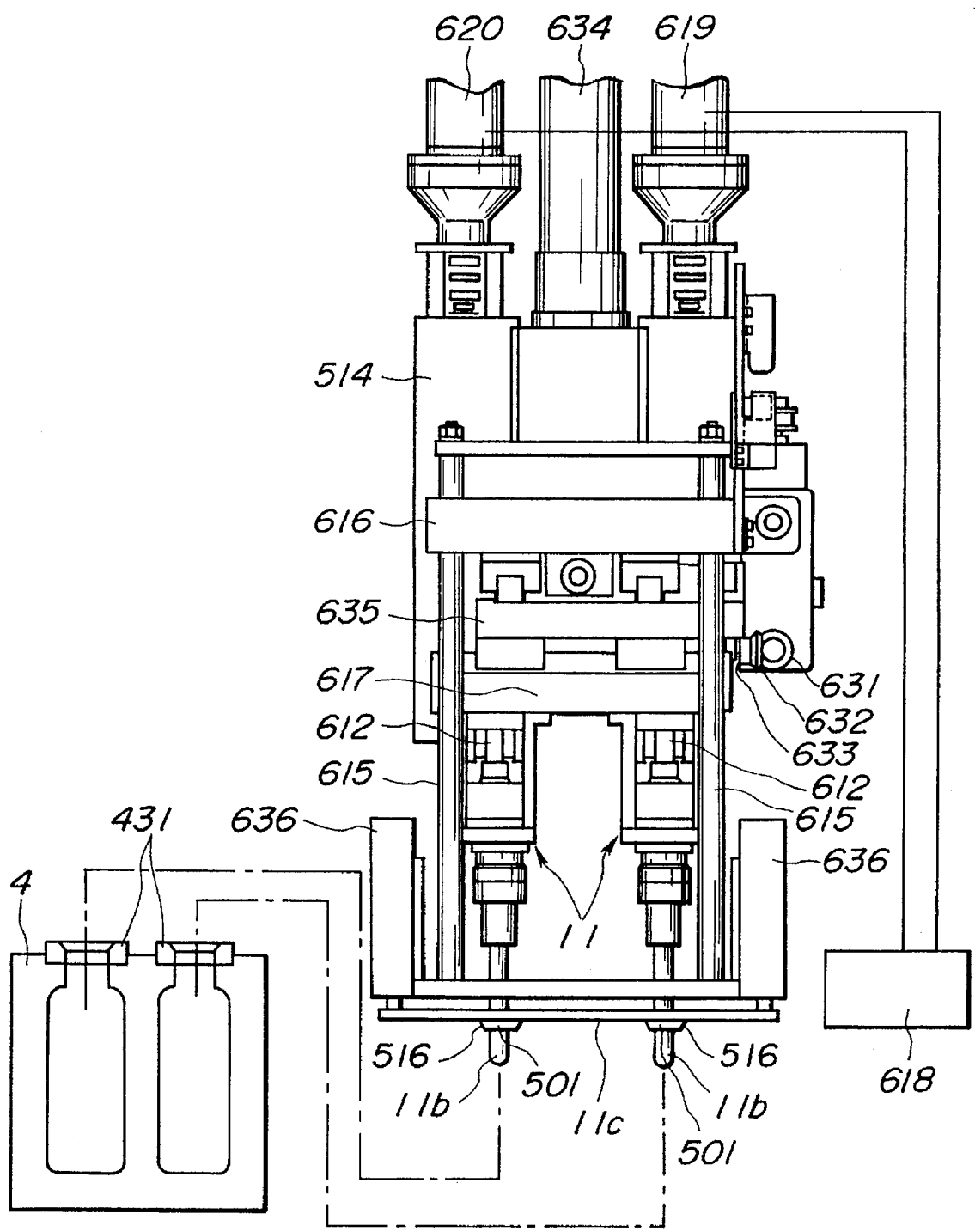
FIG. 22 is a view similar to FIG. 9, showing the calibrating unit.
Figure 23:
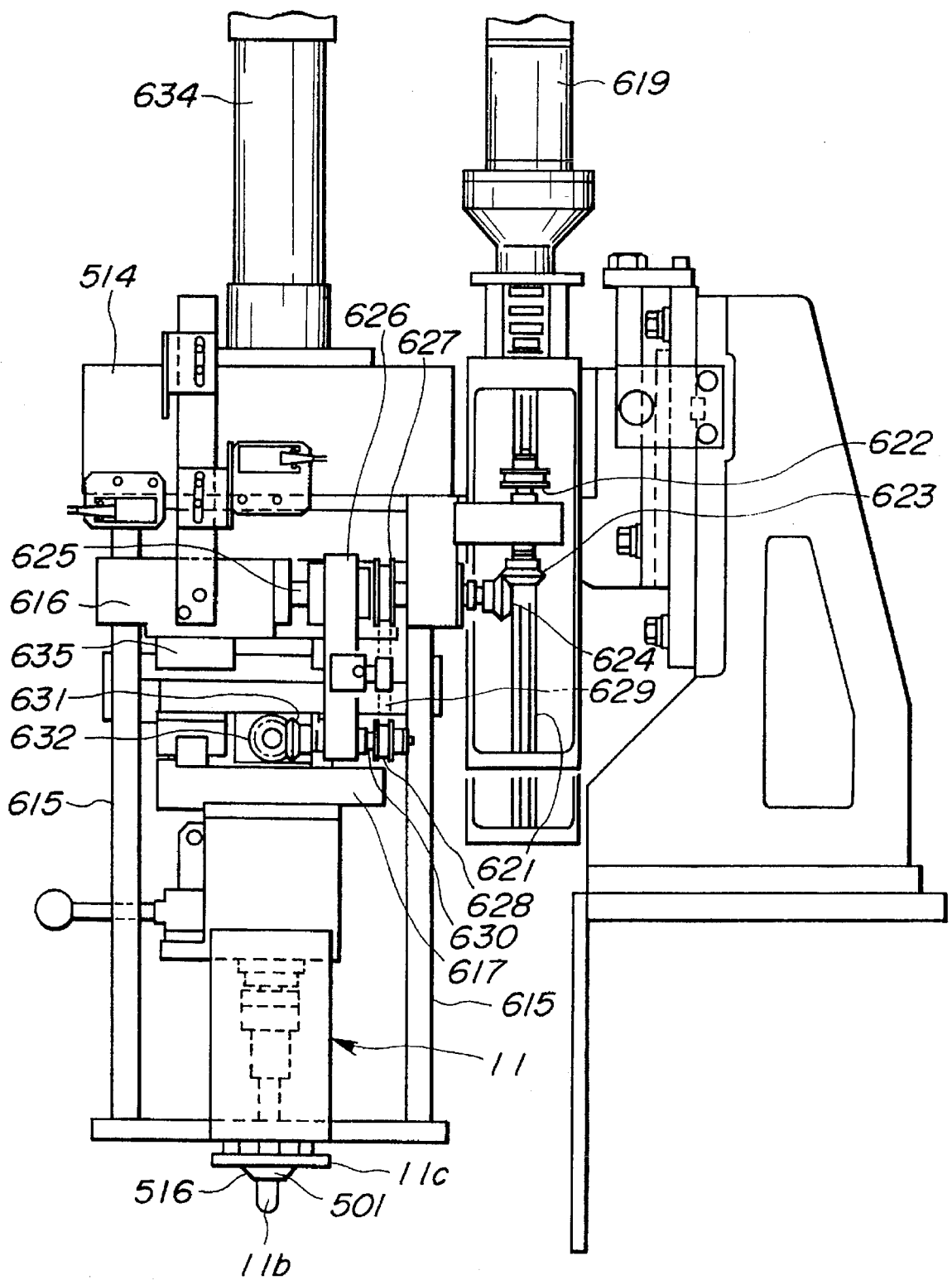
FIG. 23 is a view similar to FIG. 12, showing the calibrating unit.

Referring next to FIGS. 22 and 23, a description will be made with regard to the constitution for swinging the blow pin 11b in the X-axis and Y-axis directions. As shown in FIG. 22, two servo motors or actuators 619, 620 are arranged at a top of a main body 514 of the calibrating unit 5 so as to move a coordinate-axes table 617 in the X-axis and Y-axis directions. Four guide shafts 615 are arranged to the main body 514 of the calibrating unit 5 in a lower portion thereof so as to extend downward. A movable table 616 is engaged with the guide shafts 615 to be vertically movable through an air cylinder 634, and the coordinate-axes table 817 is supported thereto through a support member 635 to be movable in the X-axis and Y-axis directions. The pair of blow pins 11b are arranged to the coordinate-axes table 617 so as to extend downward. Air cylinders or servo motors 636 are also arranged to move the stripper plate 11c upward and downward.

As shown in FIG. 23, a spline shaft 621 is mounted to the X-axis servo motor 619, and a rotation as transmitted to the spline shaft 621 is transmitted to the rotation shaft 622 supported to the movable table 616 through a timing belt, a pulley, etc., which is in turn transmitted to a rotation shaft 625 through spiral bevel gear 623, 624. The rotation shaft 625 is formed with a spline along which a support member 626 is slidable in the Y-axis direction or in the longitudinal direction as viewed in FIG. 23.

A rotation as transmitted to the rotation shaft 625 is transmitted to a rotation shaft 630 through pulleys 627, 628, a timing belt 629, etc., which is in turn transmitted through spiral bevel gears 631, 632 to a rotation shaft 633 supported to a support member 635 as shown in FIG. 22. The coordinate-axes table 617 is mounted to the rotation shaft 633 in a threaded portion thereof through a ball screw (not shown) so as to be movable in the X-axis direction or in the longitudinal direction as viewed in FIG. 22 by rotation of the rotation shaft 633.

A rotation of the Y-axis servo motor 620 causes a movement of the support member 635 in the Y-axis direction through a gear train, a rotation shaft, etc. (not shown), with which the coordinate-axes table 617 is also moved in the Y-axis direction. In the same way as the prior art, a backlash in the above gears is eliminated by using a biasing force of a spring. The movable table 616 is vertically moved along a guide shaft 615 supported to the main body 514. In FIG. 22, reference numeral 618 designates a control unit which serves to control the operation of the servo motors 619, 620.

Figure 24:
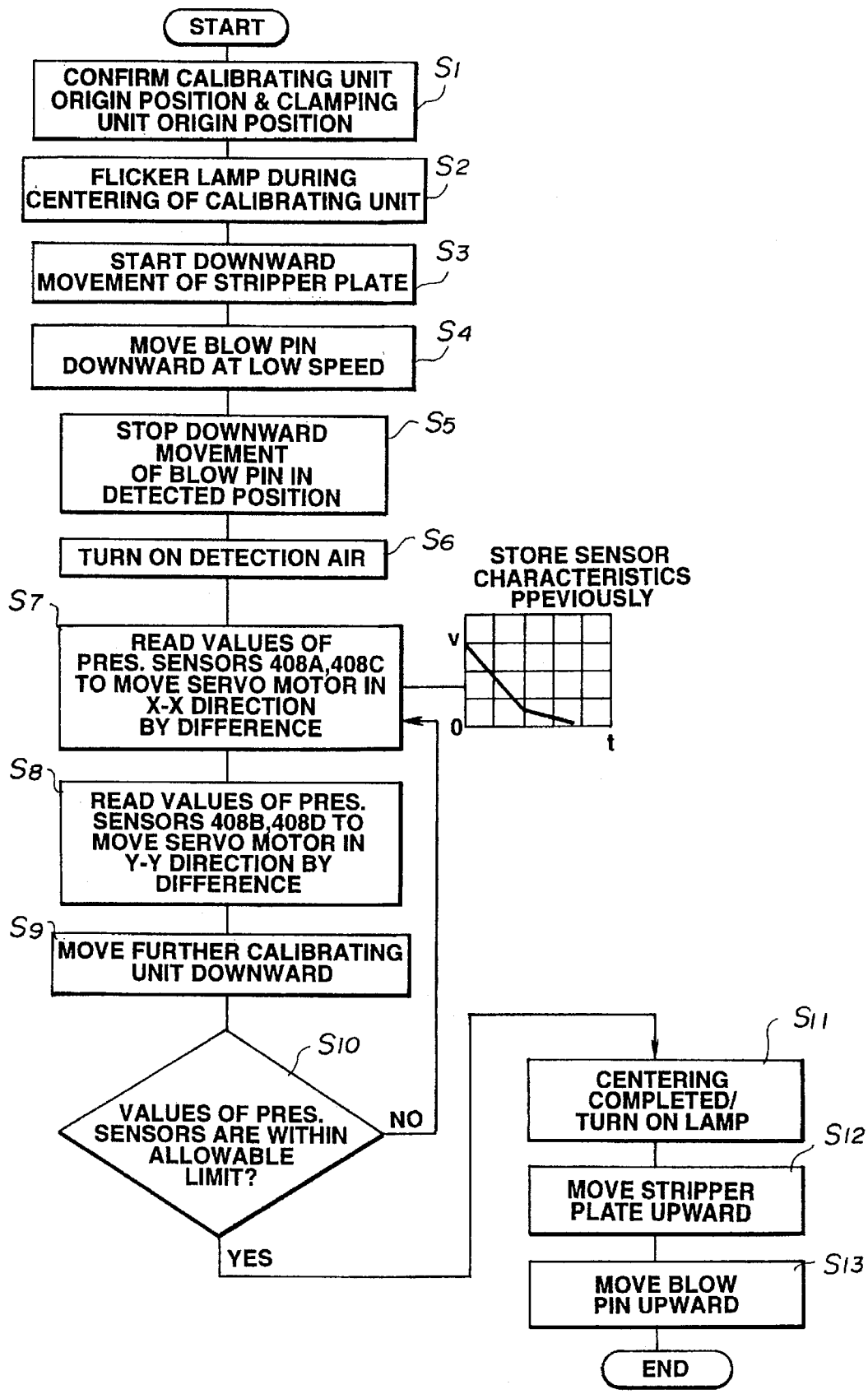
FIG. 24 is a view similar to FIG. 4, showing the operation of the automatic centering equipment.

Referring to FIG. 24, the operation of the above constitution will be described. First, a confirmation is made with regard to a position of the origin of the blower unit 5 and that of the origin of the mold clamping unit 3 (step S1). A lamp is flickered during a centering of the calibrating unit 5 (step S2). The stripper plate 11c and the blow pin 11b of the calibrating unit 5 are started (step S3), and moved downward at low speed (step S4). The blow pin 11b and the stripper plate 11c are stopped in a detected position (step S5), i.e., in a state as shown in FIG. 19.

Detection air is blown from the blowout openings 405A–405D (step S6). Specifically, when the stripper bush 516 is inserted into the cutting plate 431, the fluid supply source 409 sends air to the passages 407 so as to blow it from the blowout openings 405A–405D. Air is blown against the conical outer peripheral face 501 of the stripper bush 516, and discharged outside from a clearance between the stripper bush 516 and the conical inner peripheral face 432 of the cutting plate 431. At that time, if the stripper bush 516, i.e., the blow pin 11b, is not positioned in the center of the cutting plate 431, the back pressures or flow rates of air blown from the blowout openings 405A–405D are different from each other. The back pressure or flow rate may be measured by blowing air against the outer peripheral face of the blow pin 11b in place of the stripper bush 516.

The pressures or flow rates of air are detected by pressure sensors 408A–408D or flow sensors, which are input to the control unit 618 so as to calculate the difference of detection values. The servo motors 619, 620 are operated so that the difference of the detection values is zero, swinging the blow pin 11b in the X-axis or Y-axis direction. Thus, the blow pin 11b can be positioned in the center of the conical inner peripheral face 432 of the cutting plate 431.

Specifically, characteristics of the pressure sensors 408A–408D are previously stored in the control unit 618. The control unit 618 reads detection values of the pressure sensors 408A, 408C to operate the servo motors 619, 620 in the X-axis and Y-axis directions by the difference between the two (step S7), and detection values of the pressure sensors 408B, 408D to operate the servo motors 619, 620 in the X-axis and Y-axis directions by the difference between the two (step S8). The calibrating unit 5 is moved further downward for confirmation (step S9), and it is determined whether or not the detection values of the pressure sensors 408A–408D are within a predetermined allowable limit (step S10). If the answer at the step S10 is YES, a centering of the calibrating unit 5 is completed, and the lamp is turned on (step S11). Then, the stripper plate 431 is moved upward (step S12), and the blow pin 11b is moved upward or to the origin (step S13), finishing all centering operation of the calibrating unit 5.

If the answer at the step S10 is NO, the flow is returned to the step 7.

According to this example, since the blow pin 11b is positioned in the center of the conical inner peripheral face 432 of the cutting plate 431, no deformation of the shape of a product opening, nor imperfection in a screw thread to be formed on an outer peripheral face of the product opening is produced.

Figure 25:
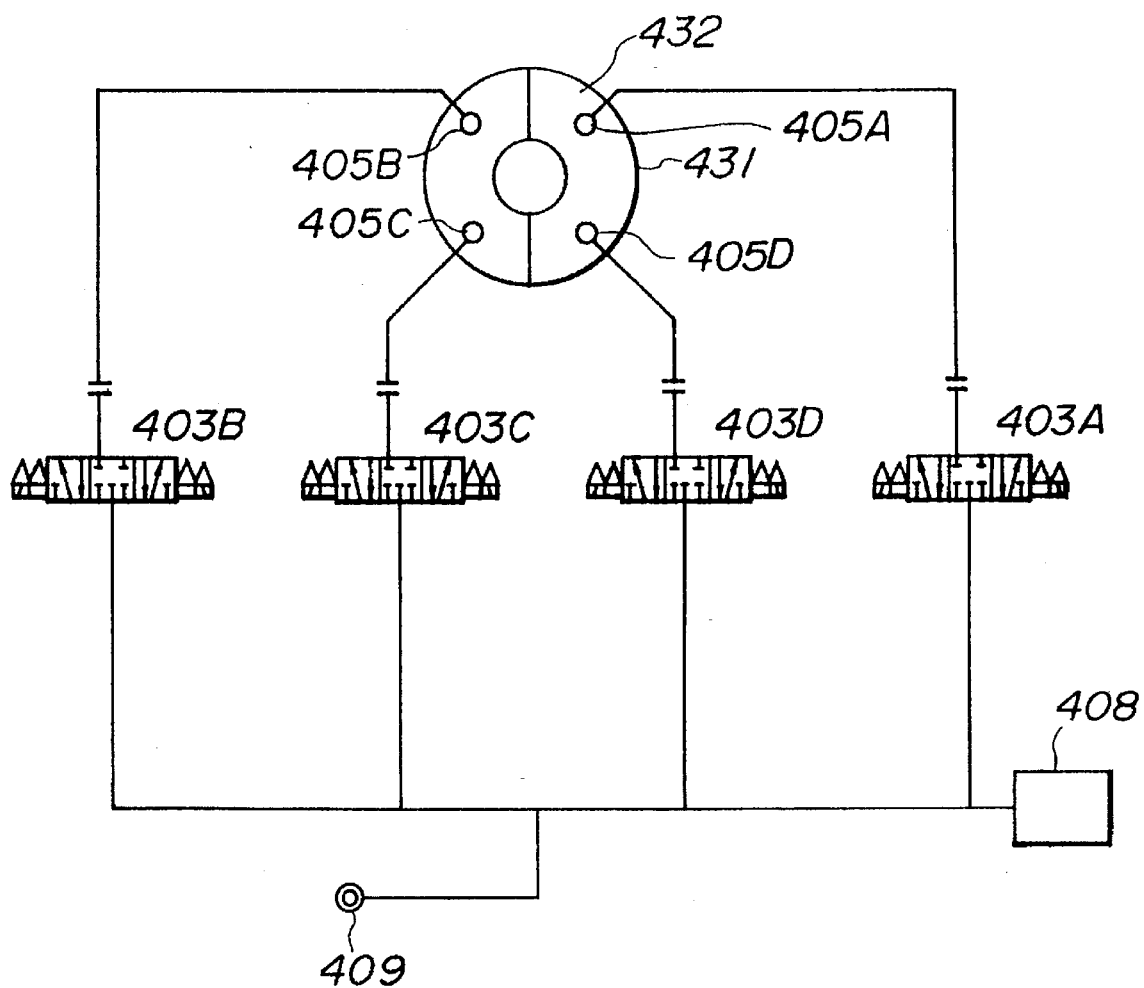
FIG. 25 is a view similar to FIG. 21, showing another example of the constitution of air passages.
Figure 26A:
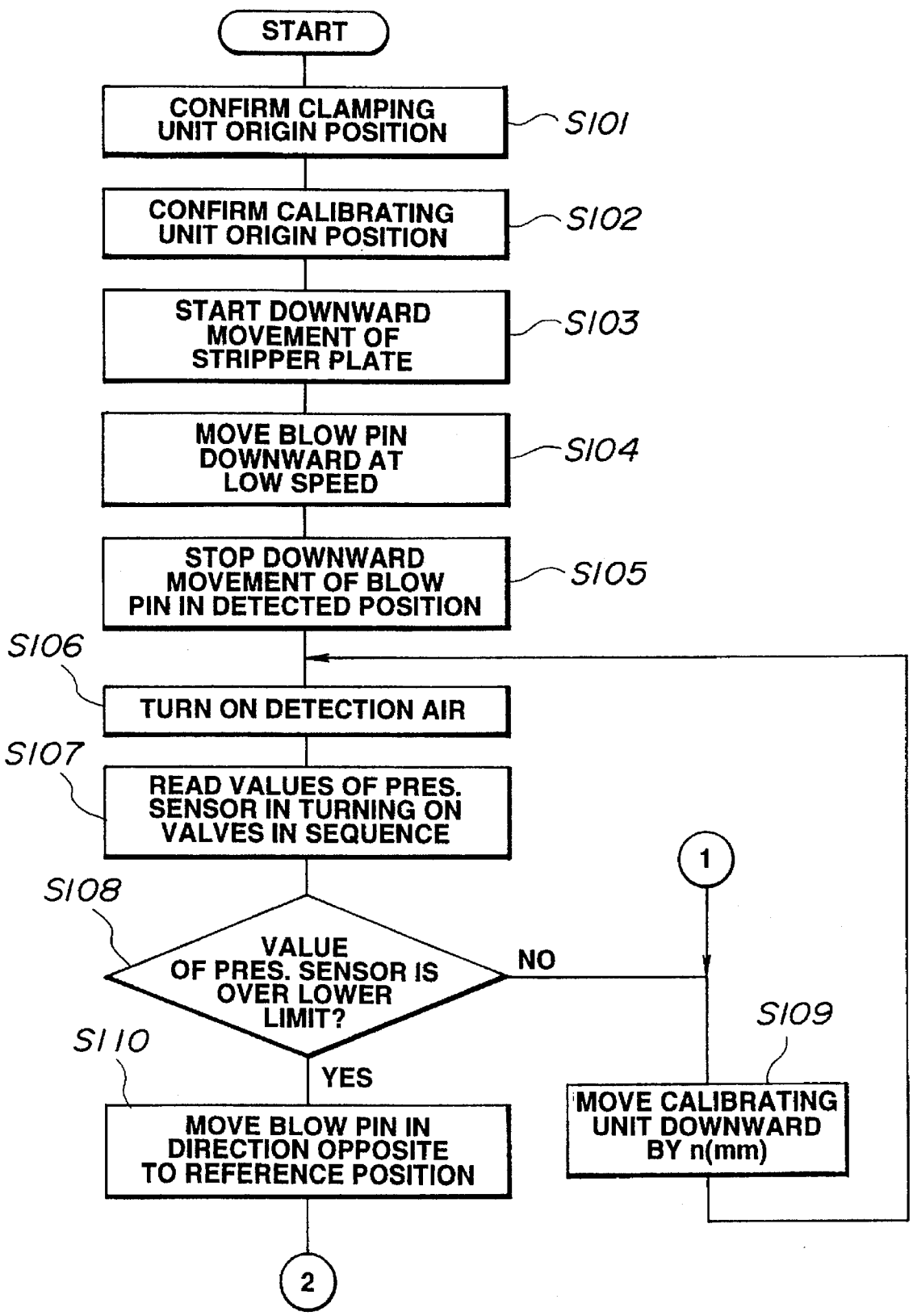
FIGS. 26A and 26B are views similar to FIG. 24, showing the operation of another automatic centering equipment.
Figure 26B:
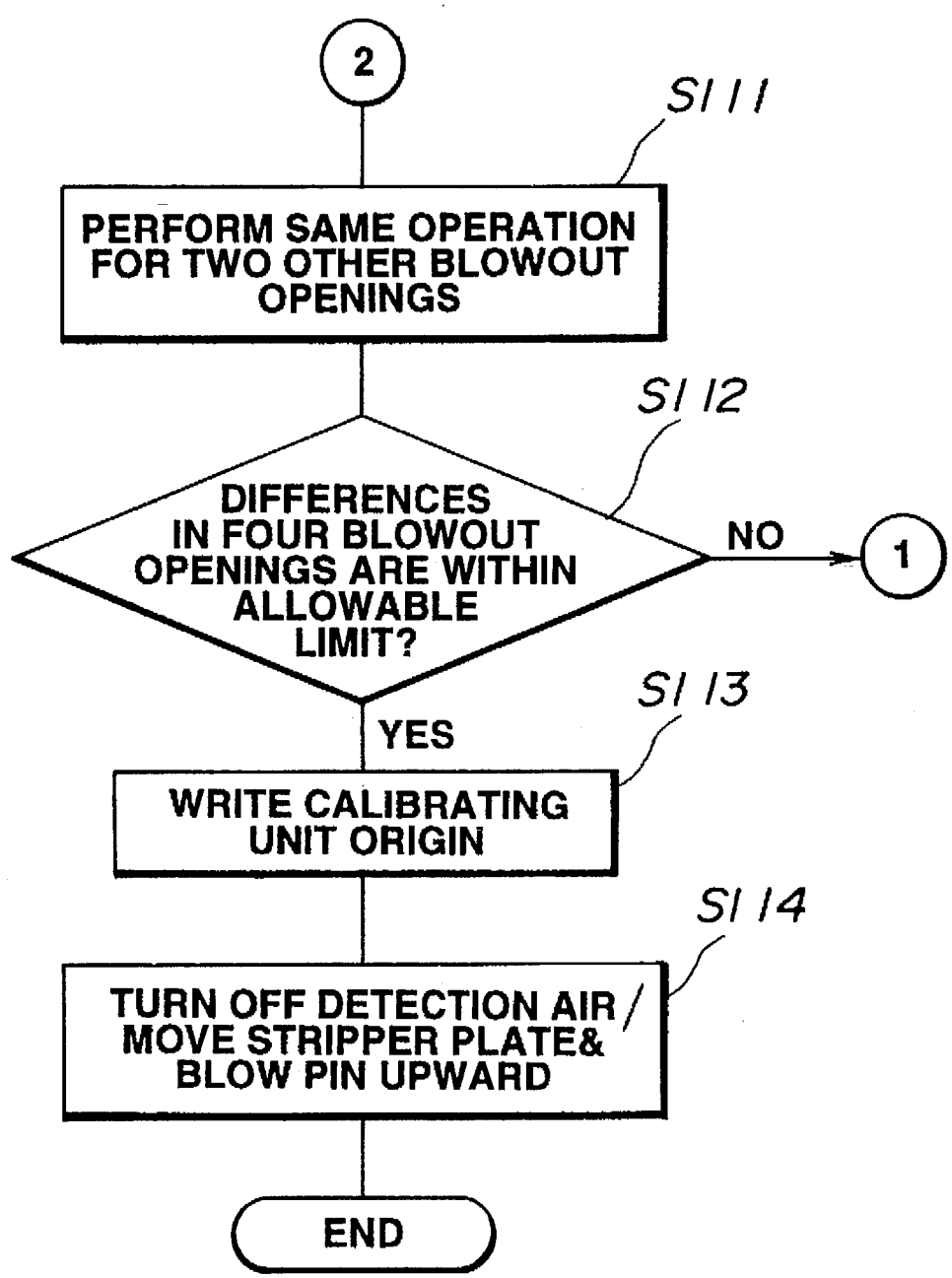

Referring next to FIGS. 25–26B, another example of an automatic centering equipment will be described. The constitution of this example is substantially the same as the example as described in connection with FIGS. 19 to 21.

First, referring to FIGS. 2 to 4, a description will be made with regard to the constitution for swinging the blow pin 11b in the X-axis and Y-axis directions. As described hereinbefore, the rails 6 are mounted on the base 1, and the support 7 is slidably disposed on the rails 6. The support 7 is formed with the vertical wall 7a having a front face on which the rails 8 are mounted in the direction perpendicular to the rails 6. The arm 9 is horizontally movably supported on the rails 8 so as to fix the calibrating unit 5. Thus, the calibrating unit 5 is movable in the longitudinal direction of the base 1 as viewed in FIG. 4 along the rails 6 by rotation of the servo motor 5d, and in the cross direction of the base 1 as viewed in FIG. 4 along the rails 8 by rotation of the servo motor 5c.

Next, referring to FIGS. 26A and 26B, the operation of the above constitution will be described. First, a position of the origin of the mold clamping unit 3 is confirmed (step S101), then a position of the origin of the calibrating unit 5 is confirmed (step S102). The stripper plate 11c and the blow pin 11b of the calibrating unit 5 are started (step S103), and moved downward at low speed (step S104). The blow pin 11b and the stripper plate 11c are stopped in a detected position (step S105), i.e., in a state as shown in FIG. 19.

Detection air is blown from the blowout openings 405A–405D (step S106). Specifically, when the stripper bush 516 is inserted into the cutting plate 431, the fluid supply source 409 sends air to the passages 407 so as to blow it from the blowout openings 405A–405D. Air is blown against the conical outer peripheral face 501 of the stripper bush 516, and discharged outside from a clearance between the stripper bush 516 and the conical inner peripheral face 432 of the cutting plate 431. At that time, if the stripper bush 516, i.e., the blow pin 11b, is not positioned in the center of the cutting plate 431, the back pressures or flow rates of air blown from the blowout openings 405A–405D are different from each other. The back pressure or flow rate may be measured by blowing air against the outer peripheral face of the blow pin 11b in place of the stripper bush 516.

A solenoid valve 403A as shown in FIG. 25 is turned on to blow air from the blowout opening 405A, and after a predetermined period of time, e.g., "t" sec., the control unit 618 reads a value of the pressure sensor 408. Then, with the solenoid valve 403A turned off, and the solenoid valve 403B turned on to blow air from the blowout opening 405B, the control unit 618 reads a value of the pressure sensor 408. A similar operation is carried out in sequence for the solenoid valves 403C, 403D to read values of the pressure sensor 405 (step S107). It is to be noted that the pressure is low when a clearance between the cutting plate 431 and the stripper bush 516 is large, whereas the pressure is high when the clearance is small.

At a first detection or measurement, it is checked whether or not one of the values of the pressure sensor 408 is over a predetermined lower limit (step S108). If the answer at the step S108 is NO, the calibrating unit 5 is moved downward by a predetermined distance, e.g., "n" mm (step S109), and the flow is returned to the step S106. On the other hand, if the answer at the step S108 is YES, the servo motors 5c, 5d are driven at the same revolution so that the blow pin 11b is moved at low speed in the direction opposite to a reference position which corresponds to one of the blowout openings 405A–405D having the maximum pressure. During this movement of the blow pin 11b, the solenoid valve corresponding to another blowout opening opposite to the reference position is kept turned on. When the pressure of another blowout opening is equal to the reference value or above maximum value, the servo motors 5c, 5d are stopped. Then, the servo motors 5c, 5d are backed by ½ the distance between start and stop positions thereof (step S110).

A similar operation is carried out for the two other blowout openings, obtaining X-axis and Y-axis center of the blow pin 11b (step S111). Subsequently, it is determined whether or not the pressure difference in four blowout openings 405A–405D is within a predetermined allowable limit (step S112). It is to be understood that until all the pressures of the blowout openings 405A–405D are over the lower limit and the pressure difference in four blowout openings 405A–405D is within a predetermined allowable limit, a similar detection or measurement is carried out by moving the calibrating unit 5 downward by "n" mm per detection. When confirming that all the pressures of the blowout openings 405A–405D are over the lower limit and the pressure difference in four blowout openings 405A–405D is within the predetermined allowable limit, the origin of the calibrating unit 5 is written (step S113). Detection air is turned off, and the stripper plate 11c and the blow pin 11b are moved upward or to the origin (step S114), finishing all centering operations of the calibrating unit 5.

According to this example also, since the blow pin 11b is positioned in the center of the conical inner peripheral face 432 of the cutting plate 431, no deformation of the shape of a product opening, nor imperfection in a screw thread to be formed on an outer peripheral face of the product opening is produced.

Having described the present invention in connection with the preferred embodiment, it is to be noted that the present invention is not limited thereto, and various changes and modifications are possible without departing from the spirit of the present invention.

What is claimed is:

1. A method of controlling a blow molding machine during a period of time from completion of a predetermined number of a first product of a first resin to preparation of production of a second product of a second resin, the blow molding machine including a plurality of devices comprising an extruder, a transport jig, a calibrating unit, first mold, blow pin, die and core for the first product, and second mold, blow pin, and die and core for the second product, the method comprising the steps of:

controlling a temperature of the first resin within the blow molding machine and a temperature of the second resin therewithin, said temperature controlling step ensuring a decrease in said temperature of the first resin and an increase in said temperature of the second resin;

controlling an operation of the plurality of devices, said operation controlling step ensuring a stop of the extruder after pressing out the first resin therein, a drainage of water within the first mold, a detaching of the first blow pin, a mounting of the transport jig, a detaching of the first mold by the transport jig, a detaching of the first die and core, a mounting of the second die and core, a mounting of the second mold, a detaching of the transport jig, a mounting of the second blow pin, a centering of the second blow pin, and a returning of the calibrating unit to a home position;

controlling a sequent transport of some of the plurality of devices in predetermined positions, said some of the plurality of devices including the first mold, blow pin, and die and core, and the second mold, blow pin, and die and core; and controlling a change of the first resin for the second resin in accordance with a supply stop of the first resin and data on the second product.

2. A method as claimed in claim 1, wherein said sequent transport of said some of the plurality of devices is carried out by the transport jig.

3. A method as claimed in claim 1, wherein said detaching of the first blow pin is carried out through a first block, a second block slidably engaged with said first block and having the first blow pin, and passages for supplying fluids to the first blow pin, said passages allowing a fluid communication between said first block and said second block in a stationary position of the two, whereas said mounting of the second blow pin is carried out through said first block, said second block slidably engaged with said first block and having the second blow pin, and said passages for supplying said fluids to the second blow pin, said passages allowing a fluid communication between said first block and said second block in said stationary position of the two.

4. A method as claimed in claim 1, wherein said centering of the second blow pin is carried out:

by measuring predetermined variables of a fluid provided from at least four points which are opposite to each other in the diametrical direction of the second blow pin when the second blow pin is inserted into the second mold, by comparing said predetermined variables with each other to obtain differences between every opposite two of said at least four points, and by moving the second blow pin so that said differences of said predetermined variables are null.

5. A method of controlling a blow molding machine during a period of time from completion of a predetermined number of a first product of a first resin to preparation of production of a second product of a second resin, the blow molding machine including a plurality of devices comprising an extruder, a transport jig, a calibrating unit, first mold, blow pin, die and core for the first product, and second mold, blow pin, and die and core for the second product, the method comprising the steps of:

controlling a temperature of the first resin within the blow molding machine and a temperature of the second resin therewithin;

controlling an operation of the plurality of devices, said operation controlling step ensuring a stop of the extruder after pressing out the first resin therein, a drainage of water within the first mold, a detaching of the first blow pin, a mounting of the transport jig, a detaching of the first mold by the transport jig, a detaching of the first die and core, a mounting of the second die and core, a mounting of the second mold, a detaching of the transport jig, a mounting of the second blow pin, a centering of the second blow pin, and a returning of the calibrating unit to a home position, said detaching of the first blow pin being carried out through a first block, a second block slidably engaged with said first block and having the first blow pin, and passages for supplying fluids to the first blow pin, said passages allowing a fluid communication between said first block and said second block in a stationary position of the two, said mounting of the second blow pin being carried out through said first block, said second block slidably engaged with said first block and having the second blow pin, and said passages for supplying said fluids to the second blow pin, said passages allowing a fluid communication between said first block and said second block in said stationary position of the two;

controlling a sequent transport of some of the plurality of devices in predetermined positions, said some of the plurality of devices including the first mold, blow pin, and die and core, and the second mold, blow pin, and die and core; and controlling a change of the first resin for the second resin in accordance with a supply stop of the first resin and data on the second product.

6. A method of controlling a blow molding machine during a period of time from completion of a predetermined number of a first product of a first resin to preparation of production of a second product of a second resin, the blow molding machine including a plurality of devices comprising an extruder, a transport jig, a calibrating unit, first mold, blow pin, die and core for the first product, and second mold, blow pin, and die and core for the second product, the method comprising the steps of:

controlling a temperature of the first resin within the blow molding machine and a temperature of the second resin therewithin;

controlling an operation of the plurality of devices, said operation controlling step ensuring a stop of the extruder after pressing out the first resin therein, a drainage of water within the first mold, a detaching of the first blow pin, a mounting of the transport jig, a detaching of the first mold by the transport jig, a detaching of the first die and core, a mounting of the second die and core, a mounting of the second mold, a detaching of the transport jig, a mounting of the second blow pin, a centering of the second blow pin, and a returning of the calibrating unit to a home position, said centering of the second blow pin being carried out by:
measuring predetermined variables of a fluid provided from at least four points which are opposite to each other in the diametrical direction of the second blow pin when the second blow pin is inserted into the second mold,
comparing said predetermined variables with each other to obtain differences between every opposite two of said at least four points, and
moving the second blow pin so that said differences of said predetermined variables are null;

controlling a sequent transport of some of the plurality of devices in predetermined positions, said some of the plurality of devices including the first mold, blow pin, and die and core, and the second mold, blow pin, and die and core; and controlling a change of the first resin for the second resin in accordance with a supply stop of the first resin and data on the second product.

7. A method of controlling a blow molding machine during a period of time from completion of a predetermined number of a first product of a first resin to preparation of production of a second product of a second resin, the blow molding machine including a plurality of devices comprising an extruder, a transport jig, a calibrating unit, first mold, blow pin, die and core for the first product, and second mold, blow pin, and die and core for the second product, the method comprising the steps of:

controlling a temperature of the first resin within the blow molding machine and a temperature of the second resin therewithin;

controlling an operation of the plurality of devices, said operation controlling step ensuring a stop of the extruder after pressing out the first resin therein, a drainage of water within the first mold, a detaching of the first blow pin, a mounting of the transport jig, a detaching of the first mold by the transport jig, a detaching of the first die and core, a mounting of the second die and core, a mounting of the second mold, a detaching of the transport jig, a mounting of the second blow pin, a centering of the second blow pin, and a returning of the calibrating unit to a home position, said detaching of the first blow pin being carried out through a first block, a second block slidably engaged with said first block and having the first blow pin, and passages for supplying fluids to the first blow pin, said passages allowing a fluid communication between said first block and said second block in a stationary position of the two, said mounting of the second blow pin being carried out through said first block, said second block slidably engaged with said first block and having the second blow pin, and said passages for supplying said fluids to the second blow pin, said passages allowing a fluid communication between said first block and said second block in said stationary position of the two, said centering of the second blow pin being carried out by:
measuring predetermined variables of a fluid provided from at least four points which are opposite to each other in the diametrical direction of the second blow pin when the second blow pin is inserted into the second mold,
comparing said predetermined variables with each other to obtain differences between every opposite two of said at least four points, and
moving the second blow pin so that said differences of said predetermined variables are null;

controlling a sequent transport of some of the plurality of devices in predetermined positions, said some of the plurality of devices including the first mold, blow pin, and die and core, and the second mold, blow pin, and die and core; and controlling a change of the first resin for the second resin in accordance with a supply stop of the first resin and data on the second product.

* * * * *